(12) United States Patent
Jasud et al.

(10) Patent No.: US 12,351,035 B2
(45) Date of Patent: Jul. 8, 2025

(54) ELECTRIC VEHICLE (EV) SYSTEM AND OPERATING METHOD

(71) Applicant: DANA ITALIA S.R.L., Arco (IT)

(72) Inventors: Pradip Jasud, Pune (IN); Shailesh Dalvi, Pune (IN); Idris Poonawala, Pune (IN)

(73) Assignee: DANA ITALIA S.R.L., Arco (IT)

(*) Notice: Subject to any disclaimer, the term of this patent is extended or adjusted under 35 U.S.C. 154(b) by 233 days.

(21) Appl. No.: 18/333,445

(22) Filed: Jun. 12, 2023

(65) Prior Publication Data

US 2024/0408956 A1  Dec. 12, 2024

(51) Int. Cl.
| | |
|---|---|
| *B60K 7/00* | (2006.01) |
| *B60K 17/02* | (2006.01) |
| *B60K 17/356* | (2006.01) |
| *B60K 23/04* | (2006.01) |
| *B60K 23/08* | (2006.01) |
| *B60L 15/20* | (2006.01) |

(52) U.S. Cl.
CPC ............ *B60K 7/0007* (2013.01); *B60K 17/02* (2013.01); *B60K 17/356* (2013.01); *B60K 23/0808* (2013.01); *B60L 15/2054* (2013.01); *B60K 2007/0061* (2013.01); *B60K 2023/046* (2013.01); *B60L 2200/40* (2013.01); *B60L 2240/24* (2013.01); *B60L 2240/423* (2013.01); *B60L 2240/50* (2013.01)

(58) Field of Classification Search
None
See application file for complete search history.

(56) References Cited

U.S. PATENT DOCUMENTS

| | | | |
|---|---|---|---|
| 8,723,344 B1 | 5/2014 | Dierickx | |
| 10,807,466 B1 | 10/2020 | Haka et al. | |
| 10,821,853 B2 | 11/2020 | Healy et al. | |
| 11,376,951 B2 | 7/2022 | Kumar et al. | |
| 11,904,684 B2 * | 2/2024 | Park | B60L 15/20 |
| 2013/0030636 A1 | 1/2013 | Sugata | |
| 2015/0337809 A1 | 11/2015 | Jordan, Sr. | |

* cited by examiner

*Primary Examiner* — Todd Melton
(74) *Attorney, Agent, or Firm* — McCoy Russell LLP

(57) ABSTRACT

Methods and systems for an electric vehicle (EV). The EV system, in one example, includes a first electric drive axle and a second electric drive axle that each include a pair of electric motors and a motor coupling clutch. The EV system further includes a controller configured to selectively engage one or both of the motor coupling clutches based on vehicle load.

20 Claims, 13 Drawing Sheets

| Working Condition | Electric motor (108) | Electric motor (110) | Electric motor (122) | Electric motor (124) | Clutch Assembly (120) | Clutch Assembly (126) | Energy Condition |
|---|---|---|---|---|---|---|---|
| Lower load/Straight travel | ON | ON | OFF | ON | Disengaged | Engaged | Higher efficiency |
| Higher load/Straight travel | ON | ON | ON | ON | Disengaged | Disengaged | |
| Turning | ON | ON | ON | ON | Disengaged | Disengaged | |
| Inoperative motor (122) and/or electronic hardware | ON | ON | Inoperative | ON | Disengaged | Engaged | |

FIG. 12

| Working Condition | Electric motor (108) | Electric motor (110) | Electric motor (122) | Electric motor (124) | Clutch Assembly (120) | Clutch Assembly (126) | Energy Condition |
|---|---|---|---|---|---|---|---|
| Lower load/Straight travel | ON | OFF | ON | OFF | Engaged | Disengaged | Higher efficiency |
| Higher load/Straight travel | ON | ON | OFF | ON | Disengaged | Engaged | Higher efficiency |
| Turning | ON | ON | ON | ON | Disengaged | Disengaged | |
| Inoperative motor (122) and/or electronic hardware | ON | ON | Inoperative | ON | Disengaged | Engaged | |

FIG. 13

ELECTRIC VEHICLE (EV) SYSTEM AND OPERATING METHOD

TECHNICAL FIELD

The present disclosure relates to an electric vehicle (EV) system which includes a motor coupling clutch for selectively rotationally coupling electric motors in a drive axle assembly.

BACKGROUND AND SUMMARY

Electric vehicles (EVs), such as all-electric vehicles, are increasing in the market for reasons such as the lack of tailpipe emissions in the case of all-electric vehicles. Electric drives with multiple motors that are each paired with a separate drive wheel have been used in certain EV platforms due to gains in tractive performance that can be leveraged by the independent control of the motors. Electric axles have been utilized in certain vehicles due to their ability to be more effectively incorporated in vehicle platforms when compared to electric drive systems with motors that are spaced away from the drive axle assembly. However, certain electric vehicles may exhibit powertrain inefficiencies during certain operating conditions. For instance, the inventors have unexpectedly recognized that when multiple motors are used in a drive axle, dual-motor operation may be inefficient during certain operating conditions and specifically in vehicles whose payload widely varies during vehicle operation.

The inventors have recognized the aforementioned issues with previous electric powertrains and developed an EV system. The EV system includes, in one example, a first electric drive axle that includes a first pair of electric motors configured to transfer mechanical power to a first drive wheel and a second drive wheel, respectively and a first motor coupling clutch configured to selectively rotationally couple the first pair of electric motors to one another. The EV system further includes a second electric drive axle with a second pair of electric motors configured to transfer mechanical power to a third drive wheel and a fourth drive wheel, respectively and a second motor coupling clutch configured to selectively rotationally couple the second pair of electric motors to one another. The EV system further includes a controller configured to selectively engage the first and/or second motor coupling clutches based on vehicle load. In this way, the electric powertrain efficiency is increased. Additionally, the vehicle may continue to be operated when one motor or associated electronic hardware of both the front and rear electric axle become inoperative.

Further in one example, selectively engaging the first and/or second motor coupling clutches includes engaging the first motor coupling clutch when a load on the first electric drive axle decreases below a threshold value and a steering angle is below a threshold value. In such an example, the controller may be further configured to shutdown one of the electric motors in the first pair of electric motors while the other electric motor is in operation. In this way, powertrain efficiency is increased by turning off one of the drive axle motors when dual-motor operation is not demanded. The EV's range may be increased as a result, thereby increasing customer appeal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 12 and 13 show tables that correspond to control schemes for electric powertrains.

DETAILED DESCRIPTION

An electric vehicle (EV) system is described herein that alters a rotational attachment between motors in a drive axle based on vehicle load, and steering angle, in certain examples. To elaborate, to increase powertrain efficiency a motor coupling clutch in a drive axle is engaged to rotationally couple traction motors in the axle which provide power to drive wheels on either side of the vehicle while one of the motors is shutdown to conserve energy. The entry conditions for this mode may include a condition where load on the axle being below a threshold value and the steering angle being below a threshold value. Conversely, the exit conditions for the single motor mode may include a condition when the steering angle increases above a threshold value and/or the load on the axle increases above a threshold value. Further, in certain examples, the configuration of front and rear drive axles may be adjusted based on the load on the specific axle and the vehicle's steering angle.

Figure 1:
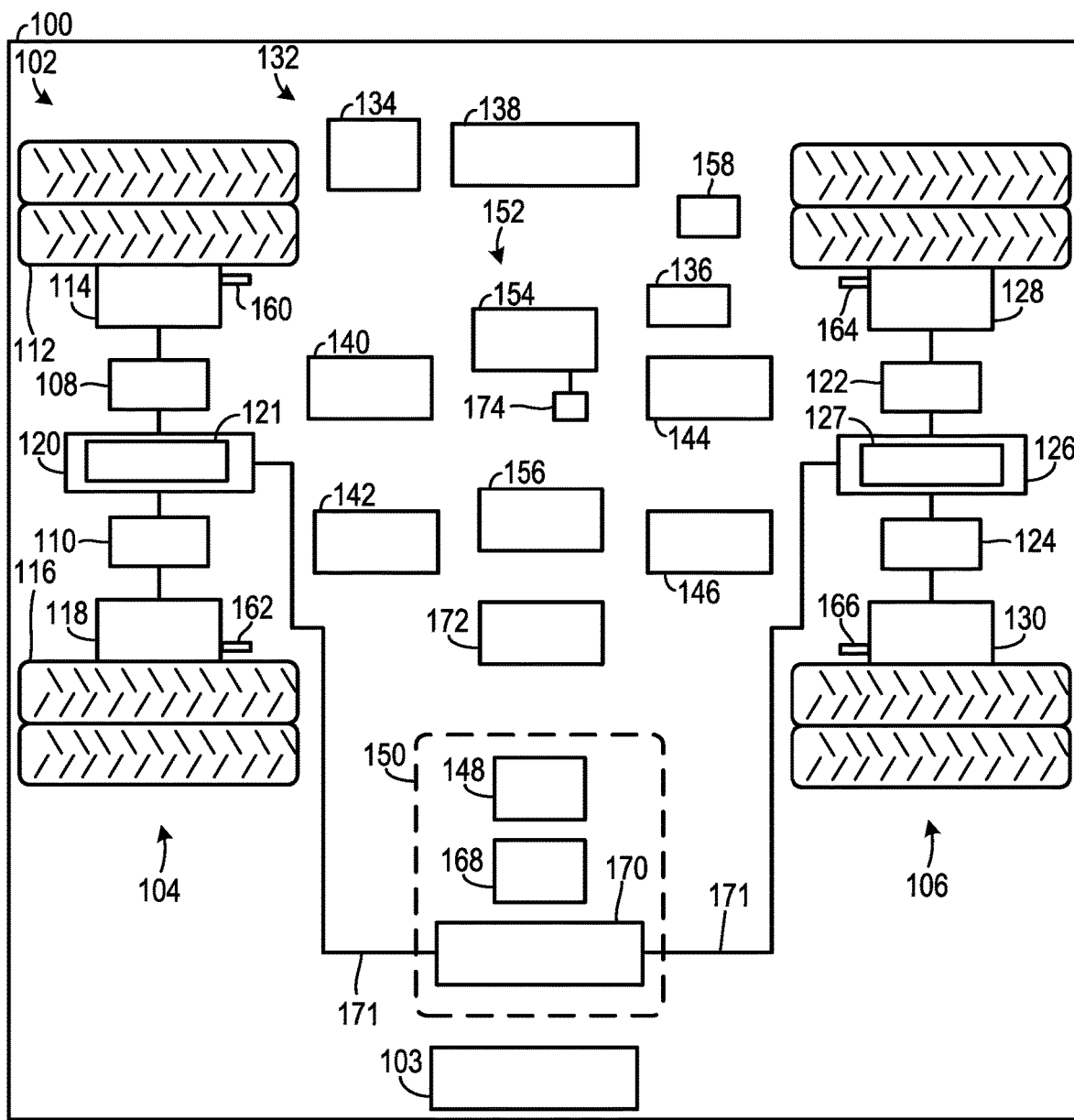
FIG. 1 shows an example of an electric vehicle (EV) with multiple electric drive axles.

FIG. 1 shows a diagram of an electric vehicle (EV) 100 with a powertrain 102. The EV may be an all-electric vehicle which may have reduced complexity and points of potential component degradation when compared to hybrid EVs. However, hybrid electric vehicle (HEV) embodiments may be employed where the vehicle includes an internal combustion engine (ICE). Further, in one example, the vehicle may be an off-highway vehicle whose size and/or maximum speed may preclude it from operating on highways. For instance, the vehicle's width may be greater than a highway lane and/or the maximum vehicle speed may be less than a minimum highway speed. However, in other examples, the vehicle may be an on-highway vehicle such as a commercial or passenger vehicle. To elaborate, the EV may be an off-highway vehicle with an articulating frame. In one specific use-case example, the EV may be a mine truck (e.g., an earth mover) with a dump box for hauling a payload. In another example, the EV may be a load haul dump truck with a bucket for hauling and dumping payload. More generally, the EV may be a medium or heavy duty vehicle. However, the EV may be a light duty vehicle, in other examples. These specific EV use-case examples are expanded upon herein with regard to FIGS. 3-11. More generally, the EV may include a payload receiving component 103 (e.g., a dump box, a bed, a bucket, and the like) that may be positioned between the electric drive axles, in one example, or may be positioned adjacent to and/or above one of the electric drive axles, in other examples.

The powertrain 102 includes a first electric drive axle 104 and a second electric drive axle 106, in the illustrated example. To elaborate, the first electric drive axle may be a front electric drive axle and the second electric drive axle may be a rear electric drive axle, in one example, or vice versa, in other examples. Further, in alternate examples, one of the first and second drive axles may be omitted from the powertrain.

As discussed herein, the numbers associated with each of the drive axles and other components described herein does not denote any structural or function hierarchy but rather may solely indicate the order in which the axles and components have been introduced. As such, the numbering of the axles and components may be altered, in other examples.

The first and second electric drive axles 104, 106 may have a similar size and component construction, in one example. However, in other examples, the size and/or types of components in the axles may vary from axle to axle. However, when the electric drive axles are of a similar size and use similar components (e.g., have an identical size and architecture) vehicle manufacturing may be simplified.

The first electric drive axle 104 includes a first electric motor 108 (e.g., electric motor-generator) and a second electric motor 110 (e.g., electric motor-generator). At least a portion of the other electric motors described herein may also be designed as motor-generators to enable the powertrain to achieve regenerative functionality where the motors are operated to recharge batteries and/or other suitable energy storage devices. The first electric motor 108 is rotationally coupled to one or more drive wheel(s) 112 via a first wheel end driveline 114 and the second electric motor 110 is rotationally coupled to one or more drive wheel(s) 116 via a second wheel end driveline 118. The wheel end drivelines (e.g., wheel end driveline hubs) may include shafts, gears (e.g., a planetary gear set), and the like that enable mechanical power with a desired speed/torque to be delivered to the corresponding drive wheel(s). However, in alternate examples, the electric motors may be directly rotationally coupled to the drive wheels.

A first motor coupling clutch assembly 120 with a motor coupling clutch 121 is additionally included in the first electric drive axle 104 and is configured to selectively rotationally couple (e.g., rotationally couple and decouple) rotor shafts of the first and second electric motors 108, 110. In this way, the motors are able to independently rotate when the clutch is disengaged and are locked for rotation with one another when the clutch is engaged. The motor coupling clutch 121 may be a friction clutch which allows the torque transferred through the clutch to be modified to enable smooth engagement and disengagement. However, in other examples, the motor coupling clutch may be a synchronizer.

The second electric drive axle 106 includes a third electric motor 122, a fourth electric motor 124, a second motor coupling clutch assembly 127, a third wheel end driveline 128, and a fourth wheel end driveline 130. These components have a similar structure and function to the corresponding components in the first electric drive axle 104. The second motor coupling clutch assembly 126 includes a motor coupling clutch 127.

The motor coupling clutches 121 and 127 may be friction clutches (e.g., multi-plate friction clutches), in one example. The torque capacity of the clutch may be altered by changing the number of plates inside the housing based on expected torque and speed demands of a particular vehicle platform. However, in alternate examples, the motor coupling clutches may be cone clutches, dog and splines clutches, combinations thereof, and the like. Further, the motor coupling clutches 121 and 127 may be hydraulically actuated, in one example. However, in other examples, the motor coupling clutches may be mechanically actuated (e.g., actuated via mechanical levers), electro-mechanically actuated, pneumatically or vacuum actuated, and the like. The EV 100 may further includes an energy storage device system 132 with a higher voltage energy storage device 134 (e.g., a battery, a capacitor, a fuel cell, combination thereof, and the like) and a lower voltage energy storage device 136 (e.g., a battery, a capacitor, a fuel cell, combination thereof, and the like). In other examples, the EV may include a fewer or greater number of energy storage devices which may or may not have different voltages. The higher voltage energy storage device 134 may be electrically coupled to the electric motors 108, 110, 122, 124 by way of an energy storage device management system 138. The energy storage device management system 138 may be configured to increase energy storage device efficiency and protect the energy storage devices from deep discharge and/or over-voltage conditions which may result from fast charge and discharge current.

Further, the energy storage device management system 138 may further be electrically coupled to the motor control units 140, 142, 144, and 146. The motor control units may include inverters that are configured to convert direct current (DC) electrical energy to alternating current (AC) electrical energy and vice versa. The motor control units 140, 142, 144, 146 are electrically coupled to the electric motors 108, 110, 122, and 124, respectively. The motors 108, 110, 122, and 124 may therefore be multiphase AC type motors which are able to achieve greater efficiency than other types of motors, in some cases.

In other examples, the energy storage device management system 138 may be omitted from the EV or may take another form. Further, in other examples, at least a portion of the motor control units may be incorporated into one or more integrated units or the motor control units may be omitted from the EV, in other examples. The higher voltage energy storage device 134 may further be electrically coupled to an electric motor 148 included in a clutch actuation system 150, discussed in greater detail herein.

The energy storage device management system 138 (e.g., battery management system) may be configured to manage the amount of electrical energy transferred between the higher voltage energy storage device 134 and the electric motors 108, 110, 122, 124 (e.g., traction motors) and the motor control units 140, 142, 144, 146 in the illustrated example.

The EV 100 may further include a control system 152 which is designed to receive sensor inputs and send control commands to actuators for various components in the EV. The motor control units 140, 142, 144, 146 may be included in the control system 152. The control system 152 may additionally include a vehicle control unit (VCU) 154 and a driveline control unit (DCU) 156. However, other control system architectures have been contemplated that include additional or alternate control units. For instance, two or more of the control units may be combined into one control unit with the functionality of the units which are incorporated therein. The control units described herein may generally be controllers with memory and processors. The memory holds instructions for carrying out the different methods, control techniques, and the like described herein.

It will be understood that various electrical connections may be established in the electric powertrain 102 by way of suitable components such as wires, cables, bus-bars, combinations thereof, and the like. To elaborate, the lower voltage energy storage device 136 may be electrically connected to the motor control units 140, 142, 144, 146, the VCU 154, the DCU 156, and/or various sensors (e.g., a steering sensor 158, wheel speed sensors 160, 162, 164, 166, and the like) described in greater detail herein. The higher voltage energy storage device 134 may be electrically connected to the energy storage device management system 138 which may in turn distribute higher voltage electrical energy to the motor control units 140, 142, 144, 146, 172. The VCU 154 may be in electronic communication with the steering sensor 158. Further, the DCU 156 may be in electronic communication with the wheel speed sensors 160, 162, 164, 166.

The sensors which are in electronic communication with the DCU 156 and/or the VCU 154 include the steering sensor 158 configured to determine a steering angle of the vehicle and the wheel speed sensors 160, 162, 164, 166 coupled to the wheel end drivelines 114, 118, 128, 130, respectively. Motor speed sensors may be coupled to the electric motors or inverters associated with the electric motors. The DCU 156 may be in electronic communication with the motor control units 140, 142, 144, 146, 172. Further, the motor control unit 172 may be in electronic communication with the electric motor 148 and a hydraulic pump 168. As such, the motor control unit 172 may adjust the speed of the electric motor 148 and the hydraulic pump 168.

Figure 2:
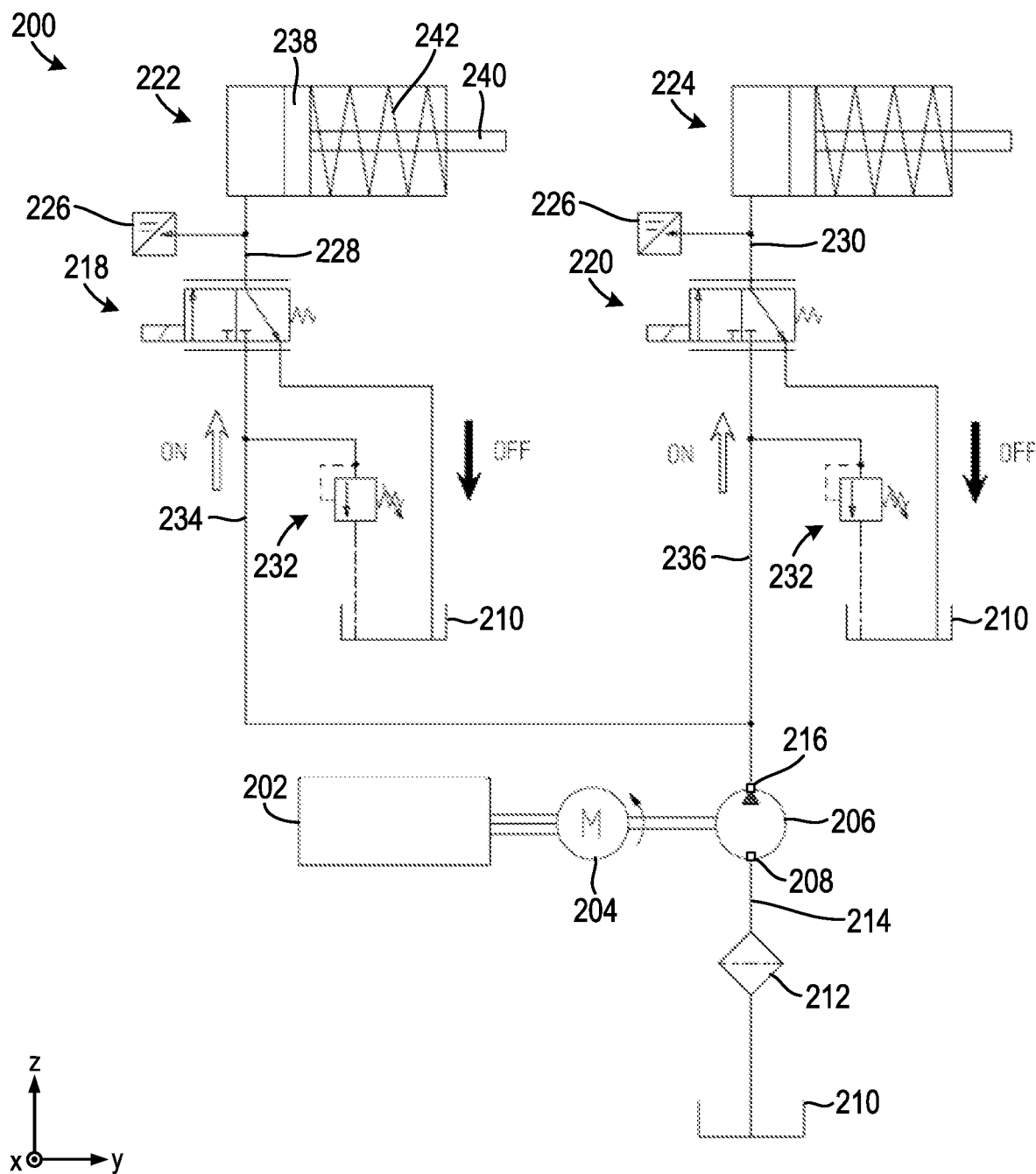
FIG. 2 shows an example of a hydraulic circuit for actuating motor coupling clutches in electric drive axles.

The clutch actuation system 150 may include the electric motor 148, the hydraulic pump 168, and/or hydraulic actuators 170. The hydraulic actuators 170 are coupled to the clutch assemblies 120, 126 via hydraulic lines 171 and/or other suitable components. An example of a clutch actuation system is shown in FIG. 2 and discussed in greater detail herein.

FIG. 1 further shows another motor control unit 172 that is electrically coupled to the DCU 156 and the electric motor 148 to enable the speed of the electric motor 148 to be adjusted. However, other motor control architectures have been contemplated. The motor control unit 172 may be included in the control system 152.

The VCU 154 may be configured to manage tractive drive operation such as acceleration, braking, steering, and the like in both forward drive and reverse drive modes. Further, the control units shown in FIG. 1 may be used to implement the methods and control techniques for adjusting the configuration of the drive axles and the motors associated therewith described in greater detail herein. The VCU 154 may receive various inputs from an input device 174 (e.g., an accelerator pedal, a brake pedal, a drive mode selector such as a gear selector, combinations thereof, and the like) that an operator interacts with to control the vehicle. Further, the VCU 154 may send commands to the DCU 156 based on the operator's interaction with the VCU. Further, the DCU 156 may control electric power input to motor control units 140, 142, 144, 146, 172. The motor control units 140, 142, 144, 146 may decide the speed and direction of rotation of the motor corresponding to the control unit based on input from the DCU 156 which results in forward, reverse, stopping, and steering functions of the EV. The electric motors 108, 110, 122, and 124 may convert electrical energy into mechanical energy and give input to each wheel end drivelines 114, 118, 128, 130. The wheel end drivelines may in turn transfer mechanical power to the drive wheels. Further, the speed sensors connected with wheel end drivelines may be configured to provide a speed signal (e.g., an instantaneous speed signal) to the DCU 156 which is used for verification of vehicle functionality. The steering sensor 158 may be attached to an articulated vehicle frame and configured to generate a steering signal (e.g., instantaneous steering signal) to the DCU 156 which is used for verification of steering functionality.

FIG. 1 as well as FIGS. 2-11 include an axis system, for reference. The z-axis may be a vertical axis (e.g., parallel to a gravitational axis), the y-axis may be a longitudinal axis (e.g., horizontal axis), and/or the x-axis may be a lateral axis, in one example. However, the axes may have other orientations, in other examples.

FIG. 2 shows an example of a clutch actuation system 200. It will be appreciated that the clutch actuation system 200 serves as an example of the clutch actuation system 150 depicted in FIG. 1. However, other techniques for clutch actuation may be used in other examples, such as pneumatic actuation systems, electro-mechanical actuation systems, combinations thereof, and the like.

In the illustrated example, the clutch actuation system 200 includes a motor control unit 202 that is electrically coupled to an electric motor 204. The electric motor 204 is rotationally coupled to a pump 206 which includes an inlet 208 that is fluidly connected to a working fluid (e.g., oil) sump 210. Further, a filter 212 may be provided in a fluid line 214. An outlet 216 of the pump 206 is fluidly connected to a first flow control valve 218 and a second flow control valve 220. The first and second flow control valves 218, 220 may be electrically actuated valves that permit and inhibit fluid flow to clutch actuators 222, 224. For instance, the flow control valves may be solenoid flow control valves. Further, the hydraulic flow control valves 218, 220 may be designed to drain fluid to the sump when closed. The hydraulic flow control valves 218, 220 permit fluid flow to the actuators 222, 224 when opened and inhibit fluid flow to the actuators when closed.

Pressure sensors 226 may additionally be coupled to fluid lines 228, 230 which fluidly connect the flow control valves 218, 220 and the actuators 222, 224, respectively. Further, pressure relief valves 232 may be coupled to the fluid lines 234, 236 that connect the flow control valves 218, 220 and the pump 206. The pressure relief valves 232 function to flow fluid into the sump 210 when the pressure in the fluid lines exceed a threshold pressure.

The actuators 222, 224 each may include a piston 238 and a shaft 240 which is coupled to clutch packs in the axle clutches (e.g., the clutch assemblies 120 and 126, shown in FIG. 1). The actuators 222, 224 may further includes springs 242 coupled to the pistons. When the pressure in the actuators increases above a threshold, correlating to the constants of the springs, the clutch assemblies engage. As such, the pressure of the fluid supplied to the actuators 222, 224 can be adjusted to cause clutch engagement and disengagement.

Arrows labelled "ON" and "OFF" in the hydraulic circuit generally indicate the direction of fluid flow in the circuit when the circuit is configured to induce clutch engagement and clutch disengagement, respectively, of each of the motor coupling clutches. It will be understood, that the hydraulic circuit may be placed in a number of different configurations. For instance, the circuit may induce disengagement or engagement of both clutches or engagement of one of the clutches while the other clutch is disengaged. Clutch control strategies are expanded upon herein with regard to FIGS. 12-15.

Figure 3:
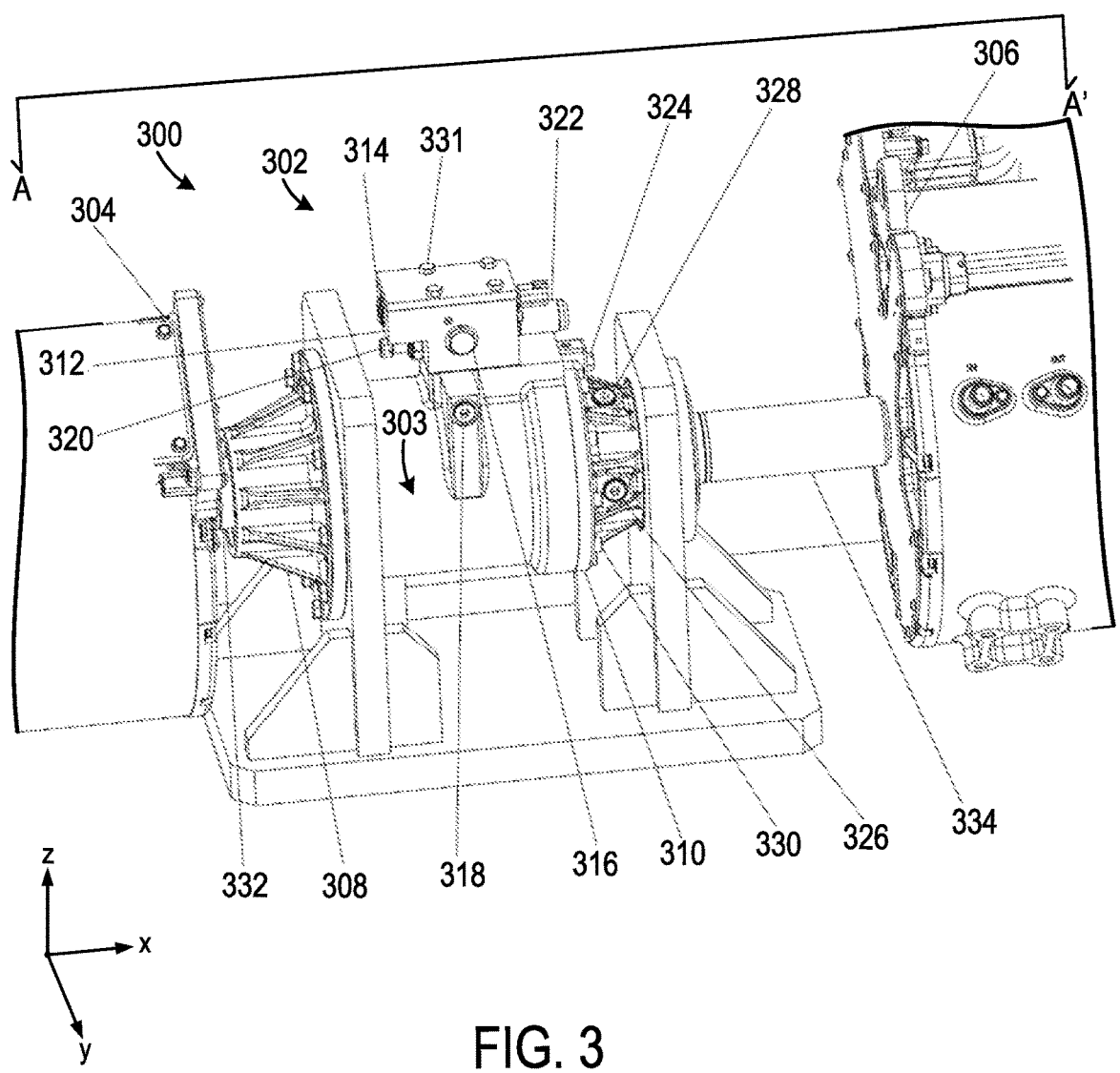
FIG. 3 shows an example of an electric drive axle.

FIG. 3 shows an example of an electric drive axle 300 with a motor coupling clutch assembly 302 with a motor coupling clutch 303 that is configured to rotationally couple and decouple a first electric motor 304 and a second electric motor 306 (e.g., rotor shafts in the first and second electric motors).

The clutch assembly 302 may include a clutch housing 308, a clutch cover 310, a control valve body 312, a control valve cover 314, a hydraulic pressure supply port 316, a pressure check port-regulator 318, a control valve pressure sensor 320, a flow control valve 322 (e.g., solenoid flow control valve), a clutch pressure check port 324, a fluid inlet port 326, a fluid outlet port 328, fasteners 330 and 331, a housing side sleeve 332, and/or a cover side sleeve 334.

The control valve body 312 and the control valve cover 314 may be fixed to each other also with the clutch housing 308 with the help of fasteners 330. The housing and cover side sleeves 332 and 334 may be connected to the respective electric motors 304 and 306 by spline connection. The hydraulic pressure supply port 316 may supply higher-pressure fluid (e.g., oil) to the clutch. The solenoid flow control valve 322 may receive commands from the DCU and open or close hydraulic pressure supply to the clutch. The pressure check port-regulator 318, the control valve pressure sensor 320, and the clutch pressure check port 324 may assist in monitoring the respective location fluid (e.g., oil) pressure using various sensors. It will be appreciated that the other electric drive axle in the EVs described herein may have a clutch assembly with a similar layout. A cutting plane A-A' is provided in FIG. 3 which corresponds to the cross-sectional views depicted in FIGS. 4 and 5.

Figure 4:
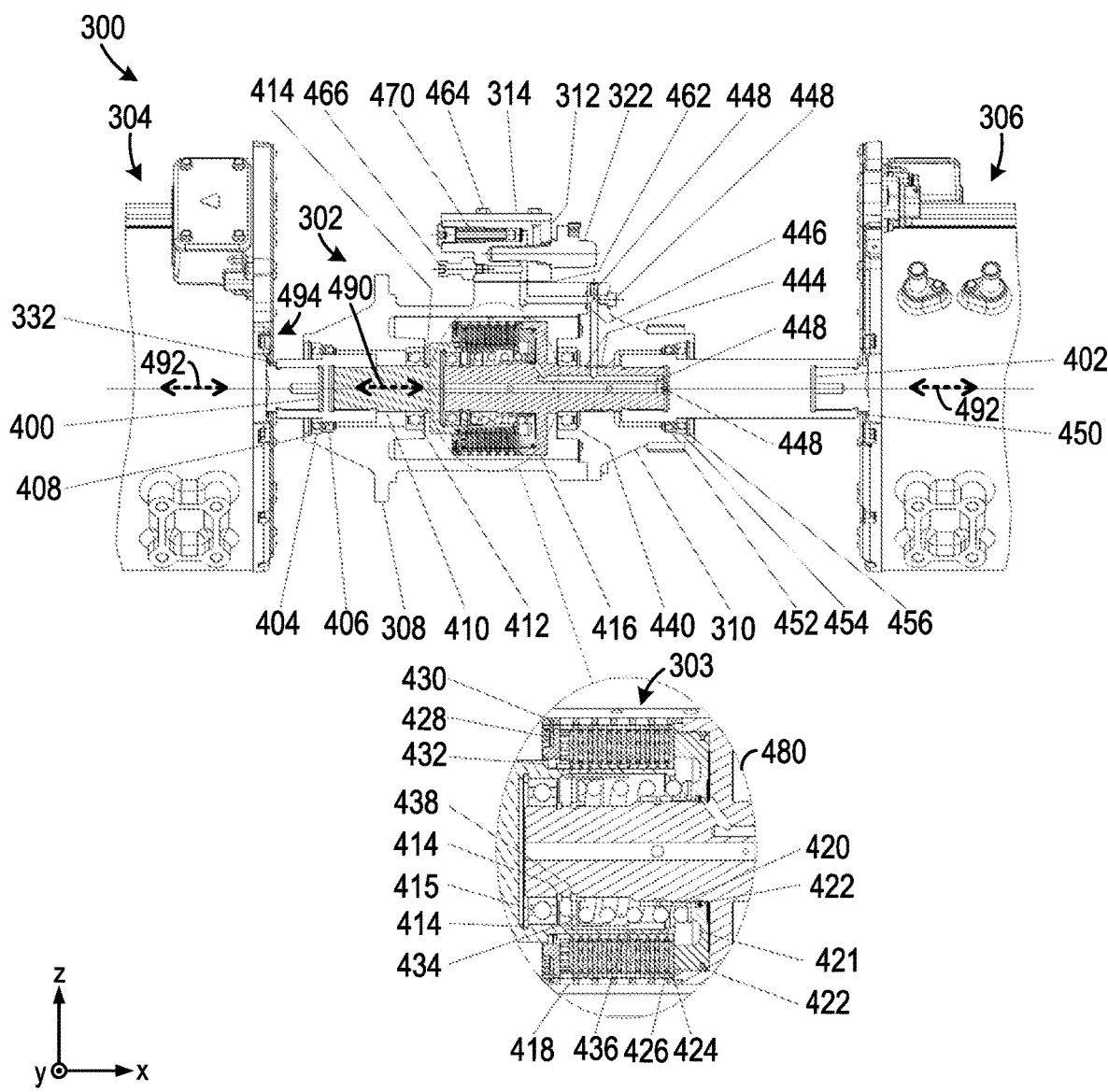
FIG. 4 shows the electric drive axle, depicted in FIG. 3, with a motor coupling clutch disengaged.

FIG. 4 shows a cross-sectional view of the electric drive axle 300 with the clutch assembly 302 and specifically the motor coupling clutch 303 in a disengaged state. An enlarged view 480 of the clutch assembly 302 is provided in FIG. 4.

Motor shafts 400, 402 in the electric motors 304, 306 are depicted in FIG. 4. The clutch housing 308 and the housing side sleeve 332 are again depicted. The clutch assembly 302 may further include a ball bearing 404, a rotary oil seal 406, a snap ring 408, a housing side clutch shaft 410, ball bearings 412 and 415, snap rings 414, a cover side clutch shaft 416, a clutch drum 418, a clutch piston 421, piston seals 422, pressure plates 424, friction plates 426, a clutch abutment plate 428, a snap ring 430, a clutch seal ring 432, spring retainers 420, 434, a piston return spring 436, a snap ring 438, a ball bearing 440, the clutch cover 310, a piston ring 444, an O-ring seal 446, plugs 448, a cover side sleeve 450, a rotary oil seal 452, a ball bearing 454, a snap ring 456, the control valve body 312, the control valve cover 314, a control valve gasket 462, fasteners 464, a control valve pressure sensor 466, the solenoid flow control valve 322, and/or a pressure relief valve 470.

The motor coupling clutch housing side sleeve 332 may be connected to the motor shaft 400 at one side and at the other side it is connected to the housing side clutch shaft 410 by spline connection. Ball bearing 404 and the rotary oil seal 406 is mounted on the housing side sleeve 332. Snap ring 408 may be used to keep ball bearing 404 and the rotary oil seal 406 intact with clutch housing 308. The ball bearing 412 may be mounted on the housing side clutch shaft 410. The snap ring 414 (e.g., back-up snap ring) is used to keep the ball bearing 412 intact with the clutch housing 308. The ball bearing 415 is mounted in between the housing side clutch shaft 410 and the cover side clutch shaft 416. The snap rings 414 may be used to keep the ball bearing 415 intact with the housing and cover side clutch shafts 410 and 416. The ball bearing 440 is mounted on the cover side clutch shaft 416 and fixed inside the clutch cover 310. The clutch drum 418 may be fixed to the cover side clutch shaft 416 by welding or other suitable attachment technique.

The clutch piston 421 is mounted inside the cover side clutch shaft 416 and it is free to slide in an axial direction. The piston seals 422 may be mounted on the clutch piston 421 and assist in reducing clutch actuating high pressure oil from leaking. The pressure plates 424 may be slidably interlocked with the clutch drum 418 on an outside diameter with the help of spline connection. The friction plates 426 may be slidably interlocked with the housing side clutch shaft 410 on an inside diameter with the help of spline connection. The friction plates 426 may have friction lining on opposing axial sides. The friction plates 426 and the pressure plates 424 may be assembled in alternate order inside the clutch assembly. The clutch abutment plate 428 may be interlocked with the clutch drum 418 on an outside diameter with the help of spline connection. Snap ring 430 may be used to lock sliding movement of clutch abutment plate 428. The clutch seal ring 432 is mounted in between the housing side clutch shaft 410 and the clutch abutment plate 428. The spring retainer 420 may be fixed on the cover side clutch shaft 416. The snap ring 438 may be used to keep one of the spring retainers 434 intact with the cover side clutch shaft 416. Further, the spring retainer 420 may be mounted on the cover side clutch shaft 416, and it may be free to slide in an axial direction together with the clutch piston 421. The piston return spring 436 may be mounted in between the spring retainers 420, 434. The piston rings 444 may be mounted inside the cover side clutch shaft 416 groove provided on both sides of the hydraulic pressure supply port.

The piston rings 444 may decrease hydraulic oil pressure leakage through clearance provided for the cover side clutch shaft assembly. The O-ring seal 446 may be mounted inside the cover side clutch shaft groove to decrease high pressure oil leakage through joint. The plug 448 may be used to close oil hole ends inside the clutch cover 310 and the cover side clutch shaft 416. The ball bearing 454 and the rotary oil seal 452 may be mounted on the cover side sleeve 450. The snap ring 456 may be used to keep the ball bearing 454 and the rotary oil seal 452 intact with clutch cover 310. The motor coupling clutch cover side sleeve 450 may be connected to the cover side clutch shaft 416 at one side and at the other side it is connected to the motor shaft 402 by spline connection. The control valve body 312 and the control valve cover 314 may be fixed to each other and with the clutch housing 308 also with the aid of the fasteners 464. The control valve gasket 462 may be used in between the control valve body 312 and the clutch housing 308. The pressure relief valve 470 may be assembled inside the control valve body 312. The pressure relief valve maintains the hydraulic oil pressure below a target value using mechanical force of a spring.

A rotational axis 490 of the motor coupling clutch 303 is provided for reference along with rotational axes 492 of the electric motors 304, 306. These rotational axes are coaxial in the depicted illustration. Further, the rotational axes of the wheel end drivelines may also be coaxially arranged with regard to the electric motors and the motor coupling clutch. In this way, axle compactness may be increased when compared to non-coaxial axle component arrangements. However, in alternate examples, the rotational axes of the motors and the clutch may not be coaxially arranged. For instance, gear reductions may be arranged between the clutch and the motors, in alternate examples.

The electric motor shafts 400 and 402 are an extension of the motor rotor shafts and may be directly coupled to the motor's rotor shaft at inboard sides 494 of the motors. The shafts 400 and 402 are rotationally coupled (e.g., splined, welded, press-fit, combinations thereof, and the like) to clutch shafts on opposing sides of the motor coupling clutch 303.

Figure 5:
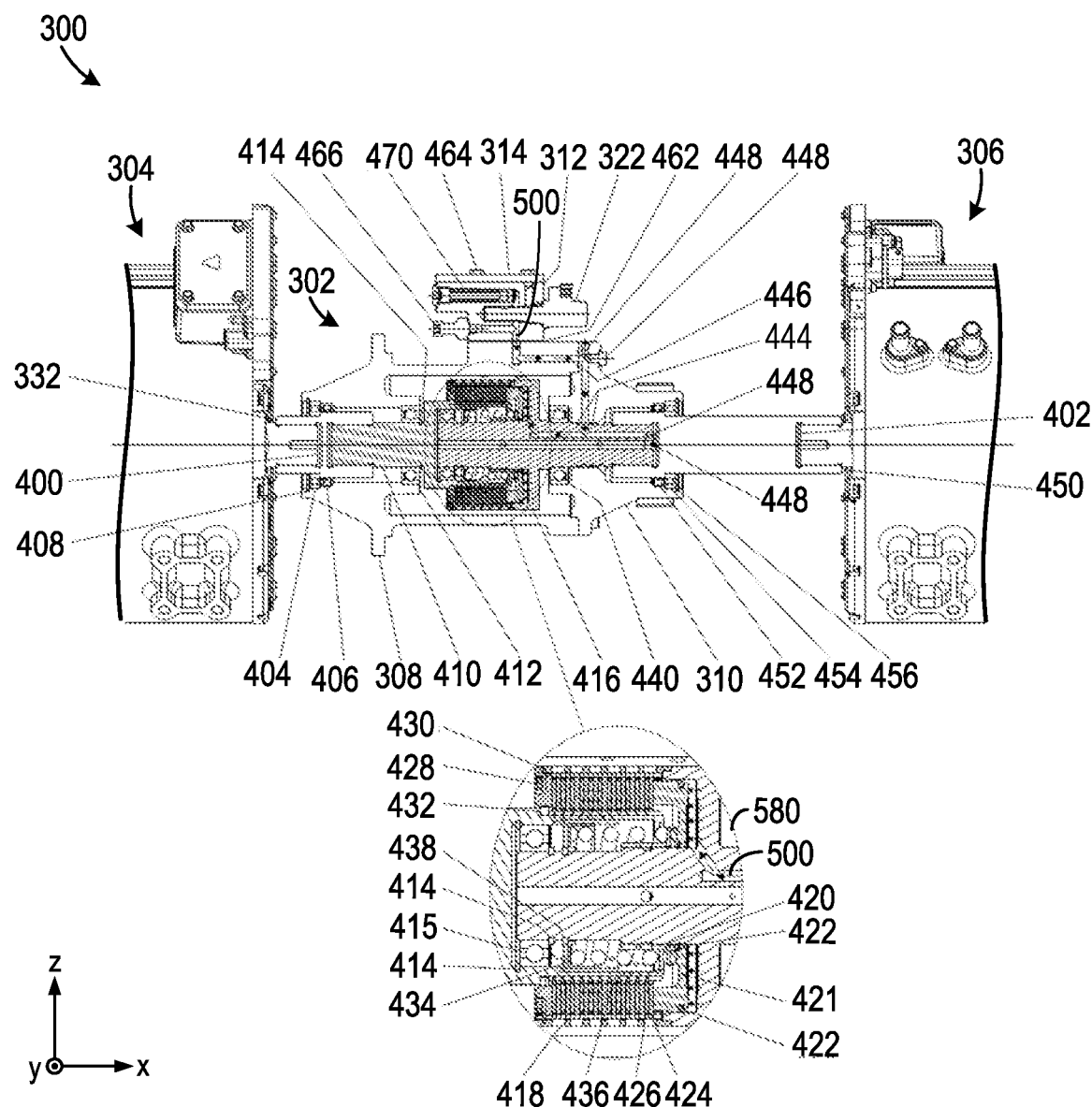
FIG. 5 shows the electric drive axle, depicted in FIG. 3, with a motor coupling clutch engaged.

FIG. 5 shows the electric drive axle 300 with the clutch assembly 302 in an engaged configuration which enables torque to be transferred between the rotor shafts of the electric motors 304 and 306. The components in the electric drive axle 300 shown in FIGS. 3-5 are similarly numbered and redundant description of the components shown in FIG. 5 are omitted for concision. However, it will be appreciated that the clutch assembly 302 is in the disengaged configuration in FIG. 4 and is in the engaged configuration in FIG. 5. An enlarged view 580 of the clutch assembly 302 is provided in FIG. 5.

As shown in FIG. 5, in the engaged configuration of the clutch assembly 302, the flow control valve 322 is in an open position. To place the flow control valve in the open position, the DCU or other suitable controller may send a command to the flow control valve 322 to place the valve in an open position that allows fluid to be delivered to the clutch's actuator. This enables the flow of oil or other suitable fluid from the sump to the pump, from the pump to the solenoid flow control valve 322, and from solenoid flow control valve to the clutch piston 421. This hydraulic fluid flow may travel through channels provided in the control valve body, the clutch housing, the clutch cover, and/or the cover side clutch shaft. To elaborate, the hydraulic fluid flow sequence inside the clutch assembly 302 may be the control valve body 312; the clutch housing 308; the clutch cover 310; the cover side clutch shaft 416; and the clutch piston 421.

The hydraulic fluid flow path is shown in FIG. 5 with arrows 500. The pressurized hydraulic fluid applies force on the clutch piston 421 and causes the clutch piston to move and apply force on separately rotating pressure plates 424 and the friction plates 426. Then the clutch piston 421 movement presses alternately assembled pressure plates 424 and the friction plates 426 against the stationary clutch abutment plate 428 with axial force. Frictional drag between alternating pressure plates 424 and friction plates 426 unites the housing side clutch shaft 410 and the cover side clutch shaft 416 which are interlocked with these clutch plates. As the housing side clutch shaft 410 and the cover side clutch shaft 416 are connected to both motor shafts 400 and 402, drive of both motor shaft also gets united. Thus, power can flow from any end motor to the other end motor. When a driveline control unit (DCU) generates a control command to bring flow control valve 322 to its release or 'OFF' position, the return of hydraulic oil from the motor coupling clutch assembly to the oil sump is enabled. Additionally, force acting on the clutch piston 421 is removed. Spring force of the compressed piston return spring 436 pushes the clutch piston 421 back to its original position. The pressure plates 424 and the friction plates 426 again start rotating separately. Thus, the motor coupling clutch disengages and separates drive of motors on both ends. However, other clutch actuation strategies may be used in the clutch assembly in other examples. For instance, the clutch assembly may be pneumatically actuated or the clutch assembly may be a synchronizer that is actuated via a shift fork or other suitable mechanism.

Figure 6:
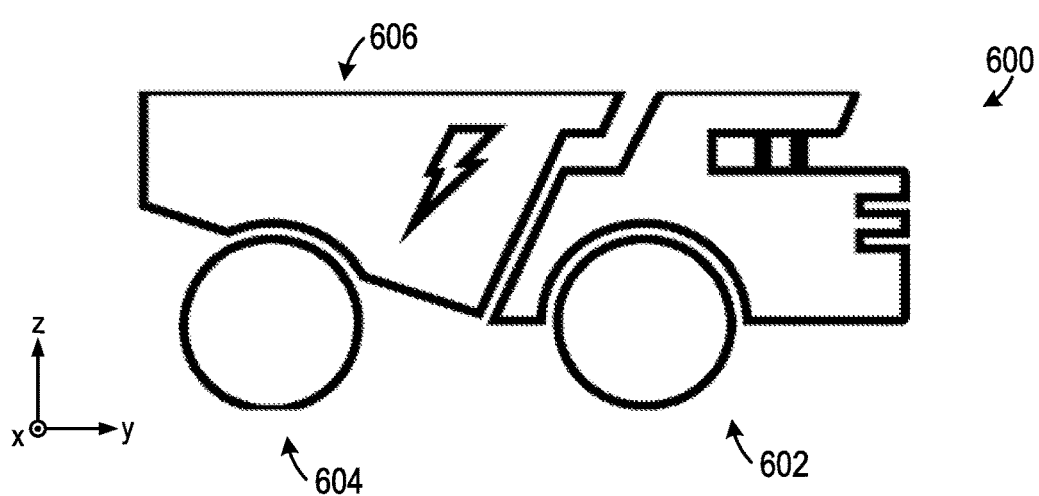
FIGS. 6 and 7 show examples of EVs.

FIG. 6 shows an example of an EV in the form of a mine truck 600. The mine truck 600 includes a front electric drive axle 602, a rear electric drive axle 604, and a dump box 606 or other suitable payload receiving component that is structured to receive payloads during operation. The electric drive axles may be referred to as electric driveline wheel systems. The dump box 606 is specifically positioned vertically above the rear electric drive axle 604. However, the dump box may be positioned above the front drive axle or between the drive axles, in other examples. The front and rear electric drive axles may have a similar structure and/or function to any of the electric drive axles described herein.

Figure 7:
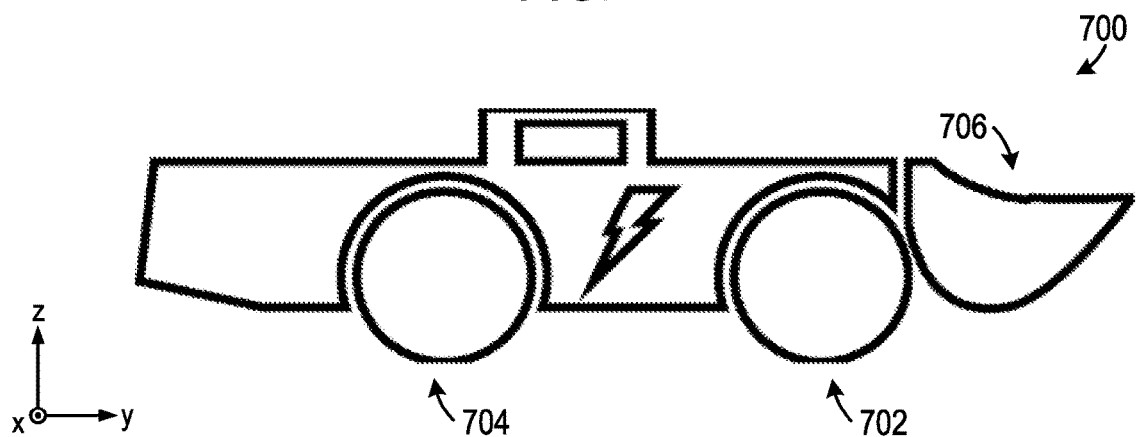

FIG. 7 shows another example of an EV in the form of a load-haul dump truck 700. The truck 700 again includes a front electric drive axle 702 and a rear electric drive axle 704. Again, the front and rear electric drive axles may have a similar structure and/or function to any of the electric drive axles described herein. The truck 700 further includes a loader bucket 706 or other suitable payload receiving component which is positioned in the front of the vehicle.

Both the EVs shown in FIGS. 6 and 7 may have varying payloads when in use. As such, the configuration of the drive axles may be varied during operation. However, due to the weight distribution in the vehicles the drive axle control scheme may vary. Methods for altering the configurations of the electric drive axles is expanded upon herein with regard to FIGS. 12-15.

Figure 8:
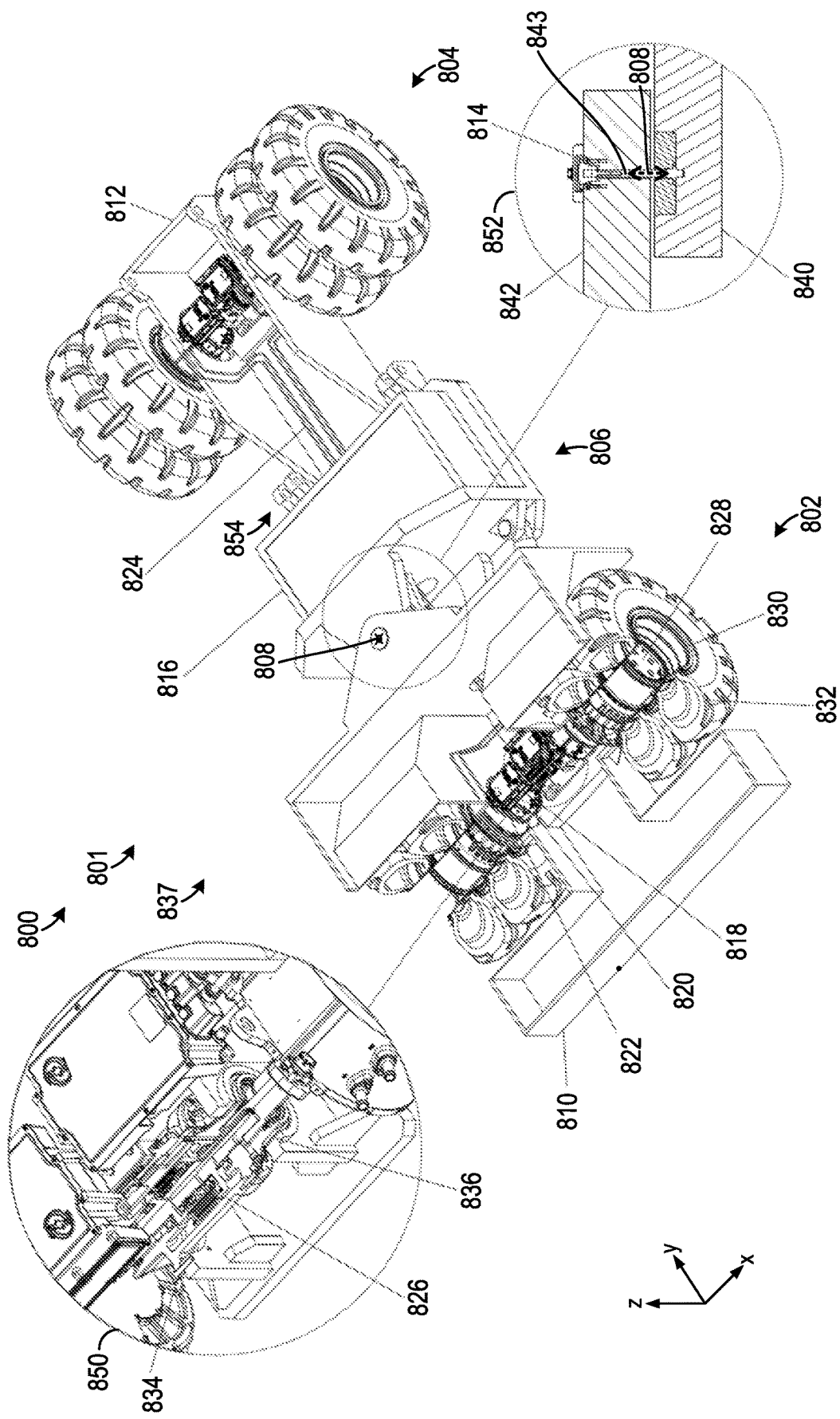
FIGS. 8 and 9 show an example of an electric vehicle driveline.

FIG. 8 shows an example of an EV 800 with a driveline 801. The EV 800 again includes a first electric drive axle 802 (e.g., front electric drive axle) and a second electric drive axle 804 (e.g., rear electric drive axle). The EV 800 in the illustrated example, includes an articulating frame 806 that may pivot about an axis 808. An enlarged view 850 of a portion of the first electric drive axle 802 and an enlarged cross-sectional view 852 of the steering sensor assembly at steering pivot point between sections of a chassis body of the EV 800 are provided in FIG. 8.

The EV 800 may include different sub-assemblies and components that may include a front chassis body 810, a rear chassis body 812, a steering sensor assembly 814, a higher voltage battery 816, motor control units (MCUs) 818, electric motors 820, phase cables 822, DC cables 824, motor coupling clutch assemblies 826, wheel end driveline assemblies 828, rims 830, wheels 832, fasteners 834, and bushings 836. The EV 800 therefore includes a powertrain 837 configured with all-wheel drive functionality. The wheel end driveline assemblies 828 and the motor control units 818 are separately fixed on the vehicle's front and rear chassis bodies 810 and 812, in the illustrated example.

The rear chassis body 812 may have a dump box pivotally coupled thereto at a section 854. As such, the dump box may be positioned above or adjacent to the electric drive axle 804 (e.g., rear electric drive axle). It will be understood that the motor coupling clutch may therefore be adjusted depending on the payload on the axle to increase powertrain efficiency. Motor coupling clutch control techniques are expanded upon herein with regard to FIGS. 12-15.

The electric drive axles 802 and 804 each include two motors and a clutch assembly, similar to the electric axles, described above with regard to FIGS. 1-7. More generally, the electric drive axles 802 and 804 may include at least some overlapping structural and/or functional features with the previously described electric axles. Redundant description is therefore omitted for brevity.

The motor coupling clutch assemblies 826 are positioned in the front and rear electric drive axles. To elaborate, the motor coupling clutch assemblies 826 are separately fixed on the front chassis body 810 and the rear chassis body 812. Ends of the motor coupling clutch assemblies 826 may be fixed to the chassis bodies 810 and 812 with the help of fasteners 834. The other ends of the motor coupling clutch assemblies may be supported on the chassis bodies 810 and 812 with the help of bushing 836. One end of each of the electric motors 820 may be connected to the corresponding wheel end driveline assembly and the other end may be connected to the corresponding motor coupling clutch assembly by splined and/or other suitable mechanical connection. Each power input for the electric motors 820 may be connected to the respective motor control unit via phase cables and/or other suitable electrical connections. The higher voltage battery 816 (e.g., battery pack(s)) may be the main power source for the motors, and may be fixed on the rear chassis body 812. The motor control units 818 may be connected to the higher voltage battery 816 via DC cables 824 and/or other suitable electrical connection. The steering arms are provided on rear and front chassis bodies 810 and 812. These arms are pivotally connected to allow rear and front chassis bodies 810 and 812 to pivot about the axis 808 with regard to one another and facilitate vehicle steering. The steering sensor assembly 814 may be fixed securely inside additionally provided such pivotally connected arms 840 and 842. A steering sensor assembly shaft 843 rotation with respect to reference position will cause signal to be generated, indicating the amount of vehicle steering angle. In one specific use-case example, eight wheels (e.g., rims and tires) may be used in the EV powertrain. However, EV powertrains with alternate numbers of wheels have been envisioned. The EV may be steered via coordinated operation of at least two motors in one of the drive axles.

Figure 9:
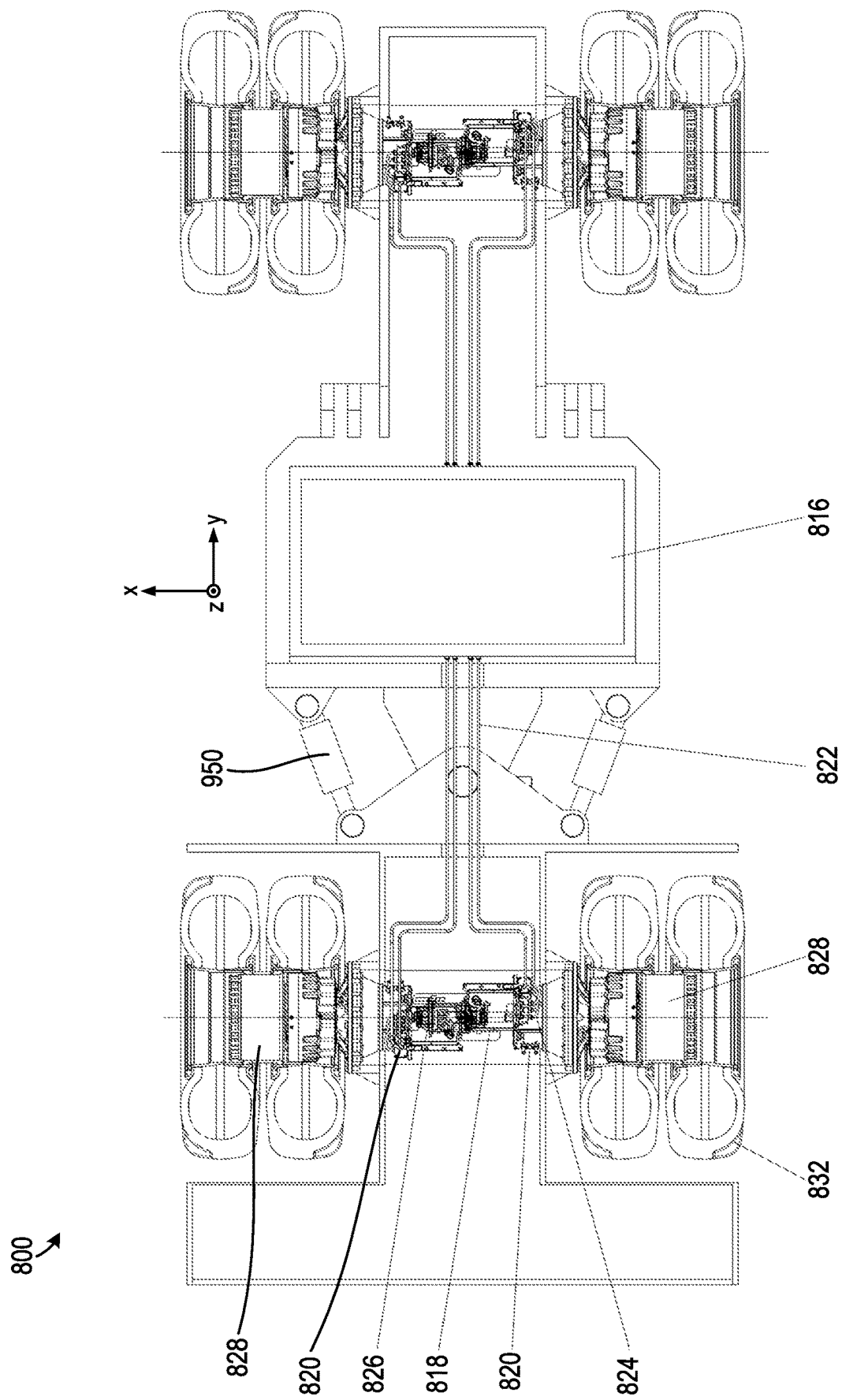

FIG. 9 shows a top view of the EV 800. The higher voltage battery 816 (e.g., battery pack(s)) may provide DC power to the MCUs 818 via the DC cables 824 and/or other suitable mechanical connections. The MCUs 818 are configured to convert DC power to AC power and vice versa. The motor control units 818 provide AC power to the electric motors 820 through phase cables 822. In the illustrated example, the electric motors 820 convert AC power to mechanical power and transfers to wheels 832 through the wheel end driveline assemblies 828. The motor coupling clutch assemblies 826 is further illustrated in FIG. 9. As previously indicated, each motor coupling clutch assembly 826 is configured to engage and disengage to rotationally couple and decouple the electric motors in the corresponding drive axle. FIG. 9 further shows a steering component 950 (e.g., a hydraulic cylinder) that is coupled to the articulating frame to enable the EV to exhibit desired steering characteristics.

Figure 10:
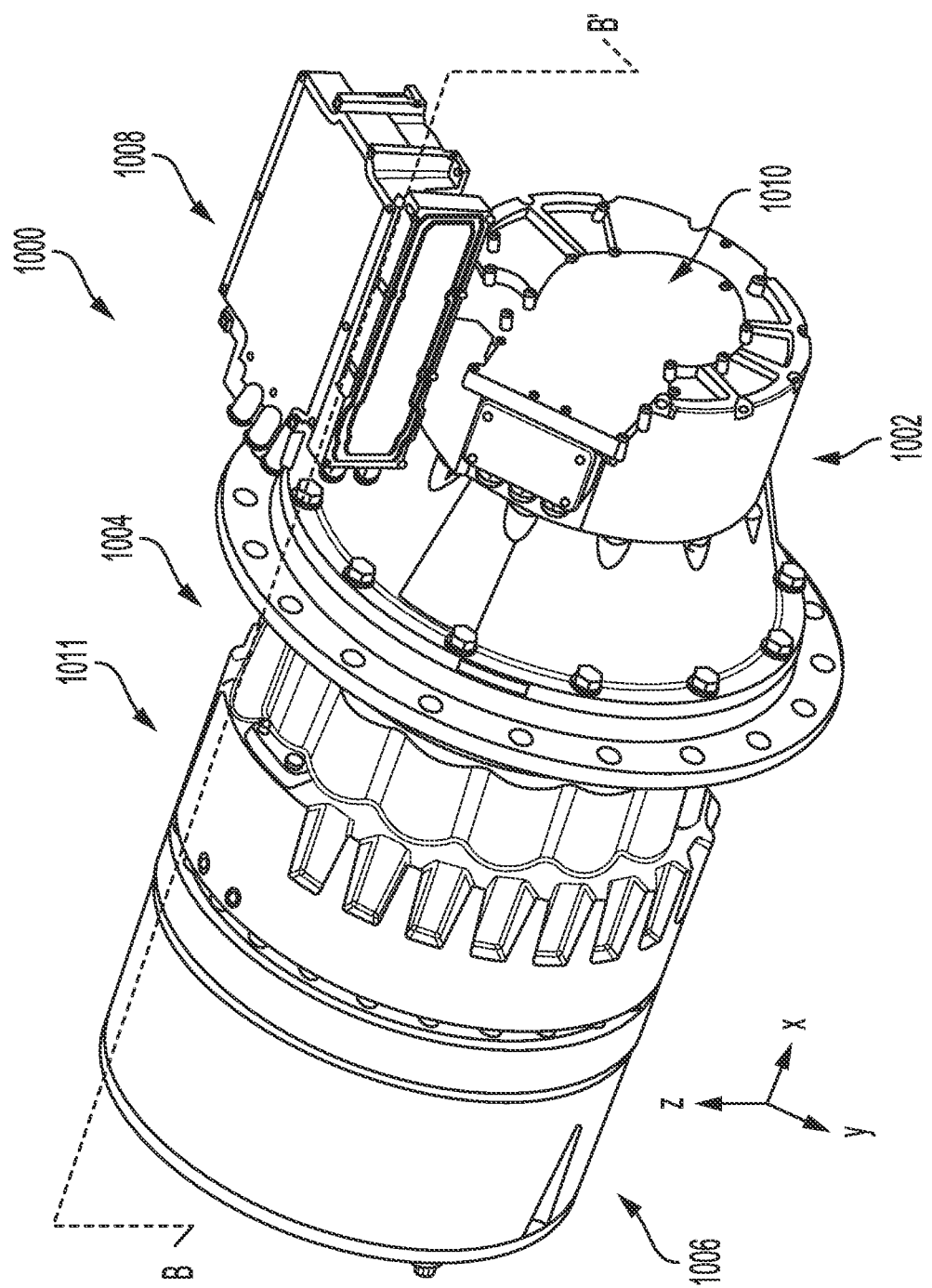
FIGS. 10 and 11 show an example of a wheel end assembly for an electric drive axle.
Figure 11:
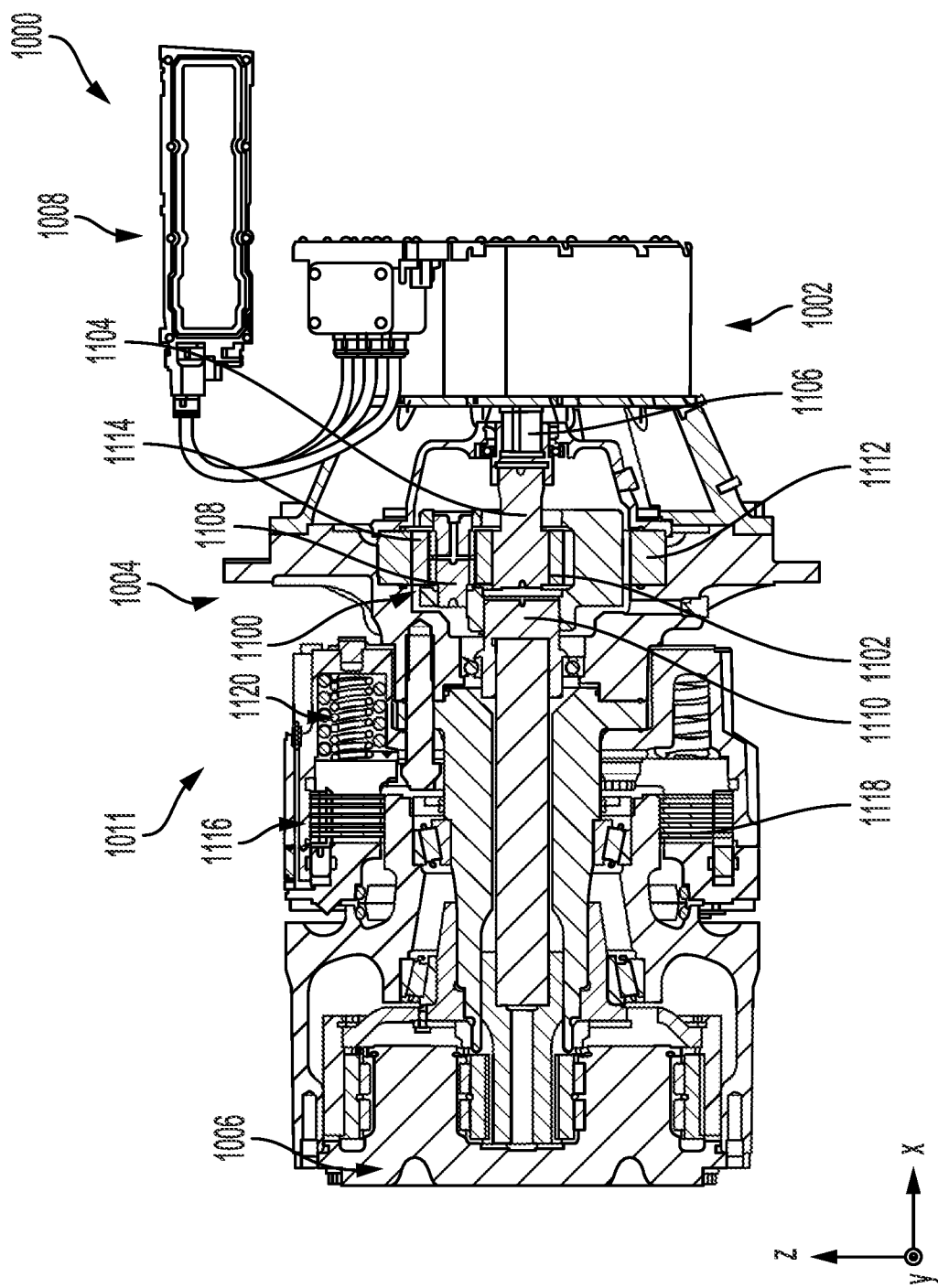

FIG. 10 shows an example of a wheel end assembly 1000 that may be included in any of the electric drive axles described herein. To elaborate, an electric drive axle may include two of the wheel end assemblies shown in FIG. 10 as well as a motor coupling clutch. The wheel end assembly 1000 includes an electric motor 1002 which is rotationally coupled to a wheel end driveline 1004 that is in turn rotationally coupled to a hub 1006. The wheel end assembly 1000 may further include a motor control unit 1008 which is electrically coupled to the electric motor 1002. It will be understood that when the wheel end assembly is incorporated into a drive axle the electric motor 1002 may include a shaft axially extending from an inboard side 1010. FIG. 10 further shows a brake assembly 1011 (e.g., a spring applied hydraulically released brake assembly). Cutting plane B-B' defines the cross-sectional view depicted in FIG. 11.

FIG. 11 again shows the wheel end assembly 1000 with the electric motor 1002, the wheel end driveline 1004, the hub 1006, and the brake assembly 1011. In the illustrated example, the wheel end driveline 1004 includes a planetary gear set 1100 that includes a sun gear 1102 rotationally coupled to the electric motor 1002 via a shaft 1104 that is coupled (e.g., splined, press fit, welded, combinations thereof, and the like) to a motor shaft 1106. The planetary gear set 1100 further includes a carrier 1108 rotationally coupled to a shaft 1110 which is connected to the hub 1006. The planetary gear set 1100 further includes a ring gear 1112 and planet gears 1114. Therefore, the planetary gear set may be a simple planetary gear set. The brake assembly 1011 in the illustrated examples includes a brake mechanism 1116 with friction plates 1118, an actuator 1120, and the like. However, the wheel end driveline may have a variety of suitable architectures, in other examples. For instance, the planetary gear set may take another form or may include one or more pairs of gears that form gear reduction stages. Further, in other examples, other suitable types of brakes may be used in the wheel end assembly.

FIGS. 12-13 show tables 1200 and 1300 that correspond to control schemes for the EV powertrain 102, the other EV powertrains described herein, combinations of the powertrains described herein, or other suitable EV powertrains.

Table 1200 may correspond to an EV powertrain with a bed which is positioned above or adjacent to a rear electric drive axle, such as the EV 600 shown in FIG. 6. Table 1300 may correspond to an EV powertrain with a loader bucket which is positioned adjacent to or above a front electric drive axle, such as the EV 700 shown in FIG. 7. Further, the columns in the tables includes the working condition of the EV, the configuration ("ON" or "OFF") of the electric motors in the front and rear drive axles, and the configuration ("Engaged" or "Disengaged") of the motor coupling clutches in the front and rear drive axles. A motor "ON" condition indicates that the motor is generating torque and a motor "OFF" condition indicates that the motor is shutdown and not generating torque. To elaborate, the configurations of the electric motors 108, 110, 122, 124 and the motor coupling clutch assemblies 120, 126 shown in FIG. 1 are indicated in FIGS. 12-13. However, it will be appreciated that the control scheme represented in the tables 1200 and 1300 may be used to control other suitable motors and/or clutches in other suitable electric drive axles. However, it will be understood that the electric motors 108, 110 and the motor coupling clutch assembly 120 are associated with a first electric drive axle (e.g., a front electric drive axle) and the electric motors 122. 124 and the motor coupling clutch assembly 126 are associated with a second electric drive axle (e.g., a rear electric drive axle). Further, it will be appreciated that the control scheme represented in the tables 1200, 1300 may be carried out by one or more controllers as instructions stored in memory that are executable by a processor. For instance, the working conditions may be determined by the controller and the motors and clutches may be transitioned into the different configurations using controller commands. The working conditions include "Lower load/Straight travel", "Higher load/Straight travel", "Turning", and "Inoperative motor (122) and/or electronic hardware" associated with the motor. The "Lower load/Straight travel" condition corresponds to an EV condition where the load on the axles is less than a threshold load and the steering angle is less than a threshold angle which is indicative of straight vehicle travel. On the other hand, the "Higher load/Straight travel" condition corresponds to an EV condition where the load on the axles is greater than the threshold load and the steering angle is less than the threshold angle which is indicative of straight vehicle travel. The "Turning" condition corresponds to an EV condition where the steering angle is greater than the threshold angle which is indicative of turning of the vehicle. The "Inoperative motor (122) and/or electronic hardware" EV condition corresponds to a condition where the motor 122 is not able to generate torque or the MCU electrically coupled to the motor is not able to send power or otherwise operate the motor 122.

As shown in table 1200 depicted in FIG. 12, under the "Lower load/Straight travel" condition, the electric motors 108, 110, and 124 are "ON" and the electric motor 122 is "OFF". Further, the clutch assembly 120 is disengaged and the clutch assembly 126 is engaged. In this way, the EV is operating at a higher efficiency when compared to a condition where all the motors are in operation and the clutch assemblies in each axle are disengaged. Consequently, EV efficiency is increased.

Under the "Higher load/Straight travel" condition, the motors 108, 110, 122, 124 are "ON" and the clutch assemblies 120 and 126 are disengaged. In this way, the EV is adapted for carrying a higher payload. Likewise, under the "Turning" condition, the motors 108, 110, 122, 124 are "ON" and the clutch assemblies 120 and 126 are disengaged.

Under the "Inoperative motor (122) and/or electronic hardware" condition, the electric motors 108, 110, and 124 are "ON" and the electric motor 122 is "OFF". Further, the clutch assembly 120 is disengaged and the clutch assembly 126 is engaged. In this way, the EV can be adapted to function when a motor becomes inoperative.

As shown in table 1300 depicted in FIG. 13, under the "Lower load/Straight travel" condition, the electric motors 108, 122 are "ON" and the electric motors 110, 124 are "OFF". Further, the clutch assembly 120 is engaged and the clutch assembly 126 is disengaged. In this way, the EV is operating under a higher efficiency operating condition when compared to a condition where all the motors are in operation and the clutch assemblies in each axle are disengaged. Consequently, EV efficiency is increased.

Under the "Higher load/Straight travel" condition, the motors 108, 110, 124 are "ON", the motor 122 is "OFF", the clutch assembly 120 is disengaged, and the clutch assembly 126 is engaged. In this way, the EV is adapted for carrying a higher payload more efficiently.

Under the "Turning" condition, the motors 108, 110, 122, 124 are "ON" and the clutch assemblies 120 and 126 are disengaged.

Under the "Inoperative motor (122) and/or electronic hardware" condition, the electric motors 108, 110, and 124 are "ON" and the electric motor 122 is "OFF". Further, the clutch assembly 120 is disengaged and the clutch assembly 126 is engaged. In this way, the EV can be adapted to function when a motor becomes inoperative.

Figure 14:
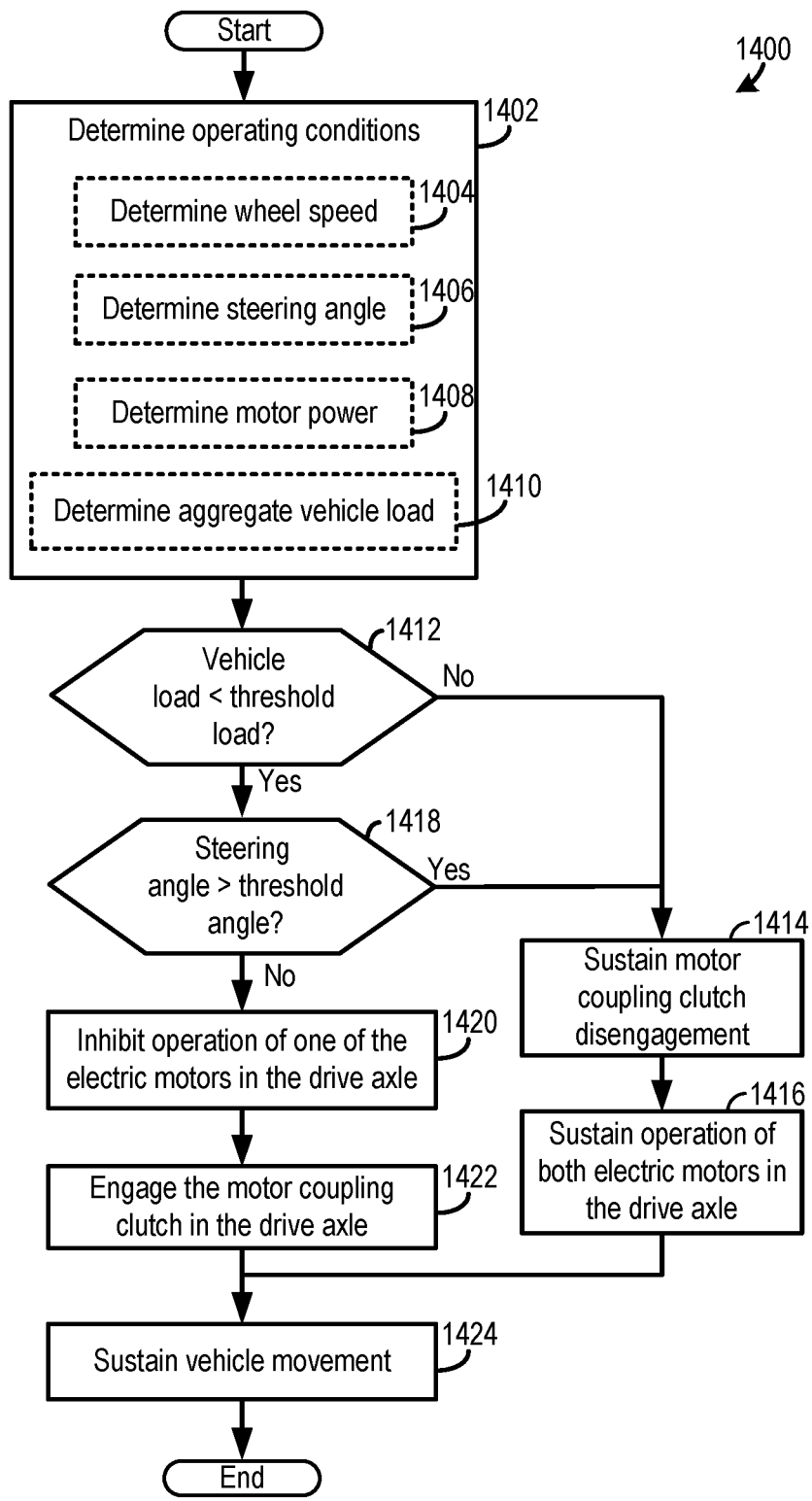
FIGS. 14 and 15 show methods for operation of electric powertrains.
Figure 15:
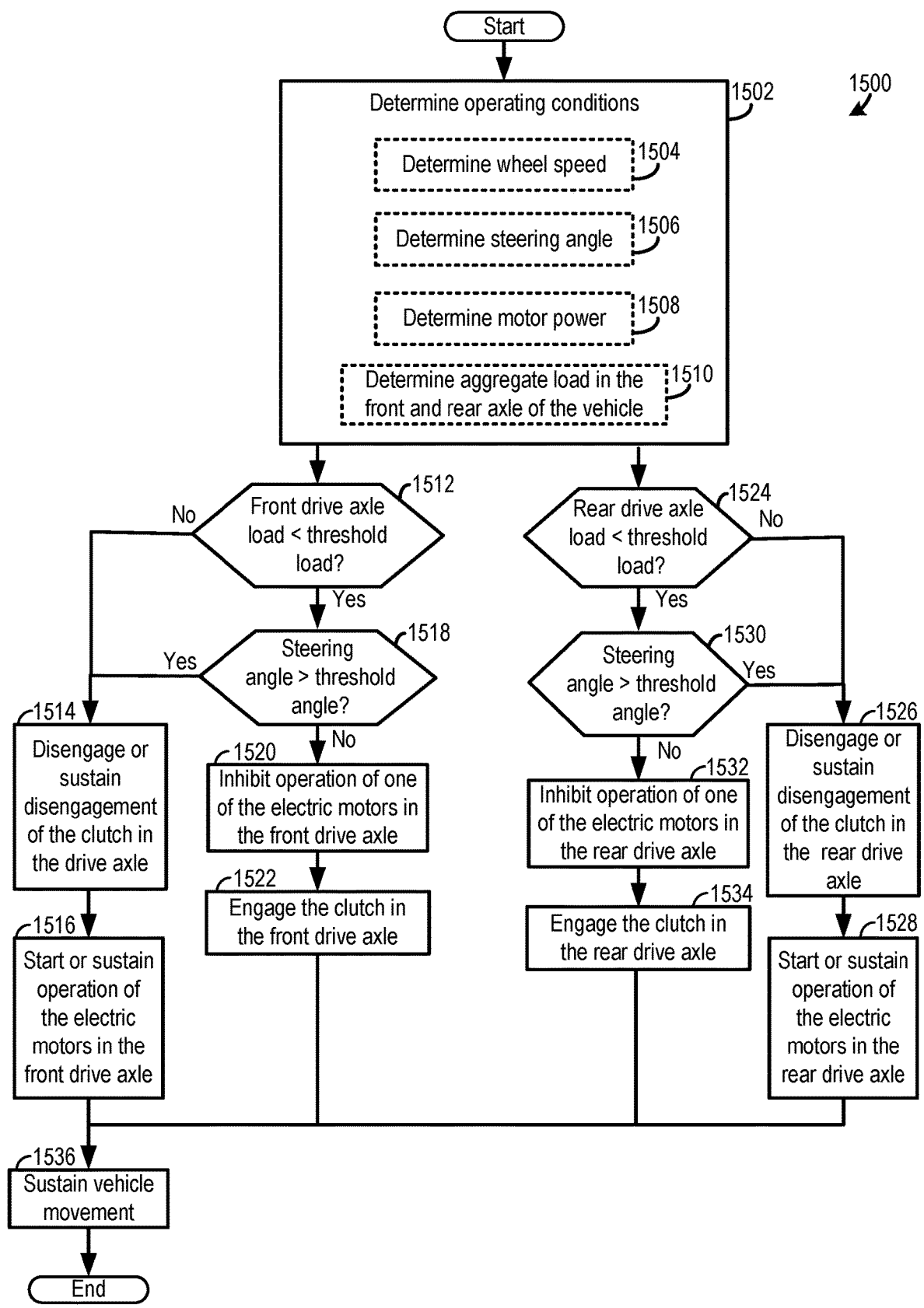

FIGS. 14 and 15 show methods 1400 and 1500 for operation of an EV system. The methods 1400 and 1500 may be carried out by any of the EV powertrains, systems, etc. or combinations of the powertrains, systems, etc. discussed above with regard to FIGS. 1-11, in one example. In particular, the method 1400 may be implemented via an EV powertrain with a bed which is positioned above or adjacent to a rear electric drive axle, such as the EV 600 shown in FIG. 6. The method 1500 may be implemented via an EV powertrain with a loader bucket which is positioned adjacent to or above a front electric drive axle, such as the EV 700 shown in FIG. 7. However, in other examples, the methods 1400 and 1500 may be implemented by other suitable powertrains, systems, and the like. Instructions for carrying out methods 1400 and 1500 may be implemented by a controller or multiple controllers such as the VCU, the DCU, the MCUs, and the like by executing instructions stored in memory of the controller and in conjunction with signals received from sensors at the controller. The controller may employ actuators in different system components to implement the method steps described below.

Method 1400 shown in FIG. 14 may specifically correspond to a control strategy associated with one electric drive axle (e.g., a rear electric drive axle). Method 1400 includes at 1402, determining operating conditions. The operating conditions may be determined using sensor inputs and/or modeling.

Determining operating conditions may include steps 1404-1410. At 1404, the method includes determining wheel speed of the drive wheels in the drive axles (e.g., the front and rear drive axles). For instance, the controller may receive inputs from wheel speed sensors coupled to the wheel end assemblies in each axle.

At 1406, the method includes determining the steering angle. For instance, the controller may receive an input from a steering angle sensor which may be included in an articulating frame. For instance, wheel steering angle and steering sensor output may be calibrated at step 1406.

At 1408, the method includes determining the amount of electrical power delivered to the motors. For instance, the amount of electrical power distributed to the motors may be ascertained via sensors in the MCUs (e.g., inverters).

At 1410, the method includes determining aggregate axle load. For instance, the electrical power delivered to the motors may be used to determine vehicle load and specifically the load on the drive axle. For instance, the vehicle load and the relative electric power consumption of motor to be calibrated or tested. In the calibration process vehicle may be tested for various loads on the vehicle and/or axle. Additionally, the power consumption of the motor may be recorded for various axle load values. This will provide a correlation between power consumption and axle load. The same correlation may be used to determine axle load based on the power consumption of motor read by the controller during actual working condition.

At 1412, the method includes determining if vehicle load (e.g., drive axle load) is less than a threshold load (e.g., a non-zero value). The vehicle threshold load value may be determined by calibration or testing vehicle. The power consumption of the motor may be recorded for various axle load values. This will provide a correlation between power consumption and axle load. The same correlation may be used to determine axle load based on the power consumption of motor read by the controller during actual working condition. The threshold load value may be a comparatively low value of axle load in empty travel where solely one motor is able to take the load. Therefore, the vehicle threshold load value may be determined by testing at which single motor can propel both wheels of drive axle with desired speed and motor efficiency will be increased. Then the vehicle DCU may be programmed to control motor coupling clutch operation based on the threshold values set for equivalent motor power consumption parameter. If it is determined that the vehicle load is not less than the threshold value (NO at 1412), the method moves to 1414 where the method includes sustaining disengagement of the motor coupling clutch. Next at 1416, the method includes sustaining operation of both of the electric motors in the electric drive axle.

If it is determined that the vehicle load is less than the threshold value (YES at 1412), the method moves to 1418. At 1418, the method includes determining if the steering angle is greater than a threshold angle. The threshold angle may be determined by testing at which the vehicle able turn little bit without tire drag. Then vehicle DCU may be programmed to control motor coupling clutch operation based on constraints set for equivalent steering sensor output parameter. If it is determined that the steering angle is greater than the threshold angle (YES at 1418) the method moves to 1414. Conversely, if it is determined that the steering angle is not greater than the threshold angle (NO at 1418) the method moves to 1420. At 1420, the method includes inhibiting operation of one of the electric motors in the drive axle. In this way, power is conserved in the drive axle. To elaborate, motor efficiency losses are reduced, thereby allowing operating resources to be reduced and smooth speed and operation over a desired range with a decreased amount of noise, vibration, and harshness (NVH). Further, shutting down operation of one of the motors increases the lifespan of the motor as well as the associated electronic hardware components due to the reduced power consumption in related electronic circuit in the period of vehicle operation.

Next at 1422, the method includes engaging the motor coupling clutch in the electric drive axle. In this way, the drive axle is able to propel the vehicle in a desired direction while one of the motors is shutdown to increase axle efficiency.

At 1424, the method includes sustaining vehicle movement. For instance, the motors which are operational may be sustained in operation to propel the vehicle in a desired direction. The method 1400 may be applied to any of the electric drive axles in the EV. To elaborate, the method 1400 may be applied to an electric drive axle that receives vehicle payload.

Method 1500, shown in FIG. 15, includes at 1502 determining operating conditions. Again the operating conditions may be determined using sensor inputs and/or modeling.

Determining operating conditions may include steps 1504-1510. Steps 1504 and 1506 are similar (e.g., identical) to steps 1406 and 1408. Therefore, redundant description is omitted for concision.

At 1508, the method includes determining the amount of electrical power delivered to the motors in each of the drive axles. For instance, the amount of electrical power distributed to the motors may be ascertained via sensors in the MCUs (e.g., inverters).

At 1510, the method includes determining aggregate load in the front and rear of the vehicle. For instance, the electrical power delivered to the motors may be used to determined vehicle load and specifically the load on each of the drive axles. For instance, the vehicle load and the relative electric power consumption of motor may be calibrated or tested. In the calibration process vehicle may be tested for various loads on vehicle, front axle and rear axle. The power consumption of the motor will be recorded for various front and rear axle load values. This will provide a correlation between power consumption and front/rear axle load. The same correlation may be used to determine front or rear axle load based on the power consumption of motor read by the controller during actual working condition.

Next at 1512, the method includes determining if the load on the front drive axle is less than a threshold value (e.g., a non-zero value). The vehicle threshold load value may be determined by calibration or testing vehicle. The power consumption of the motor may be recorded for various front and rear axle load values. This can provide a correlation between power consumption and front/rear axle load. The same correlation may be used to determine front/rear axle load based on the power consumption of motor read by the controller during actual working condition. The threshold load value may be a low value of front or rear axle load where only one motor can take load. Therefore, the vehicle threshold load may be determined by testing at which single motor can propel both wheels of front/rear drive axle with desired speed and motor efficiency will be increased. Then vehicle DCU may be programmed to control motor coupling clutch operation based on threshold values set for equivalent motor power consumption parameter. If it is determined that the front axle load is not less than the threshold value (NO at 1512), the method moves to 1514 where the method includes disengaging or sustaining disengagement of the motor coupling clutch. Next at 1516, the method includes sustaining operation of both of the electric motors in the front electric drive axle.

If it is determined that the front axle load is less than the threshold value (YES at 1512), the method moves to 1518. At 1518, the method includes determining if the steering angle is greater than a threshold angle. The threshold angle value may be determined by testing at which vehicle turn little bit without tire drag. Then vehicle DCU may be programmed to control motor coupling clutch operation based on constraints set for equivalent steering sensor output parameter. If it is determined that the steering angle is greater than the threshold angle (YES at 1518) the method moves to 1514. Conversely, if it is determined that the steering angle is not greater than the threshold angle (NO at 1518) the method moves to 1520. At 1520, the method includes inhibiting operation of one of the electric motors in the front electric drive axle. In this way, power is conserved in the front drive axle. Next at 1522, the method includes engaging the motor coupling clutch in the front electric drive axle. In this way, the front drive axle is able to propel the vehicle in a desired direction while one of the motors is shutdown to increase axle efficiency.

Steps 1524-1534 are similar to steps 1512-1522 and redundant description is omitted for brevity. However, it will be understood that steps 1512-1522 are applied to the front electric drive axle and steps 1524-1534 are applied to the rear electric drive axle. Further, threshold loads at steps 1512 and 1524 may be similar, in one example. However, in other examples, the threshold loads may vary from axle to axle. This threshold load variance may be due to the use of differently sized motors in the front and rear axles, in some examples. However, as indicated above, the motors in each drive axle may be similarly sized but the load on axles may be different, in other examples.

At 1536, the method includes sustaining vehicle movement. For instance, the motors which are operational may be sustained in operation to propel the vehicle in a desired direction. Methods 1400 and 1500 allow the motor coupling clutches in one or more drive axles to be adjusted based on axle load to increase powertrain efficiency. Consequently, EV range may be increased, thereby increasing customer appeal.

The technical effect of the EV operating methods described herein is to increase powertrain efficiency over a wider range of operating conditions that the vehicle may experience such as varying degrees of load that may occur during vehicle operation. The EV operating methods described herein may further increase EV reliability even when one of the traction motors becomes inoperative.

FIGS. 3-5 and 8-11 are drawn approximately to scale, aside from the schematically depicted components. However, the components may have other relative dimensions, in alternate embodiments.

FIGS. 1-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Elements arranged parallel and perpendicular to other elements may be referred to as such.

The invention will be further described in the following paragraphs. In one aspect, an electric vehicle (EV) system is provided that comprises an electric drive axle, comprising a first electric motor configured to transfer mechanical power to a first drive wheel; a second electric motor configured to transfer mechanical power to a second drive wheel; a motor coupling clutch configured to selectively rotationally couple the first electric motor to the second electric motor; and a controller including instructions that when executed cause the controller to selectively rotationally couple the first electric motor to the second electric motor via operation of the motor coupling clutch based on vehicle load.

In another aspect, a method for operation of an electric vehicle (EV) system is provided that comprises disengaging a motor coupling clutch to rotationally decouple a first electric motor and a second electric motor that are included in an electric drive axle based on a vehicle load and a steering angle of the EV system, wherein the electric drive axle includes the first electric motor configured to transfer mechanical power to a first drive wheel, and the second electric motor configured to transfer mechanical power to a second drive wheel.

In yet another aspect, an electric vehicle (EV) system is provided that comprises a first electric motor configured to transfer mechanical power to a first drive wheel, a second electric motor configured to transfer mechanical power to a second drive wheel, a motor coupling clutch configured to selectively rotationally couple the first electric motor to the second electric motor, and a controller including instructions that when executed, when a steering angle is less than a threshold angle and a vehicle load is greater than a threshold vehicle load cause the controller to rotationally couple the first electric motor to the second electric motor via operation of the motor coupling clutch, and operate the first electric motor to deliver mechanical power to the first and second drive wheels while the second electric motor is shutdown.

In any of the aspects or combinations of the aspects, selectively rotationally coupling the first electric motor to the second electric motor may include rotationally coupling the first electric motor to the second electric motor in response to the vehicle load decreasing below a threshold value.

In any of the aspects or combinations of the aspects, the controller may further include instructions that when executed, when a vehicle steering angle exceeds a threshold angle and when the vehicle load is below the threshold vehicle load, cause the controller to sustain rotational decoupling between the first electric motor and the second electric motor.

In any of the aspects or combinations of the aspects, selectively rotationally coupling the first electric motor to the second electric motor may include rotationally coupling the first electric motor to the second electric motor when a steering angle is less than a threshold angle.

In any of the aspects or combinations of the aspects, the controller may further include instructions that when executed, in response to the vehicle load decreasing below the threshold value and when a steering angle is less than a threshold angle, cause the controller to operate the first electric motor to provide mechanical power to the first and second drive wheels while the second electric motor is shutdown.

In any of the aspects or combinations of the aspects, the electric drive axle may be a rear electric drive axle and the EV system may be included in an EV with a payload receiving component position adjacent to and/or above the rear electric drive axle.

In any of the aspects or combinations of the aspects, the motor coupling clutch may be a friction clutch.

In any of the aspects or combinations of the aspects, the friction clutch may be hydraulically actuated via a hydraulic actuation system.

In any of the aspects or combinations of the aspects, the controller may be a motor control unit that is in electronic communication with an actuation motor in the hydraulic actuation system.

In any of the aspects or combinations of the aspects, the first electric motor, the second electric motor, the first drive wheel, and the second drive wheel may be coaxially arranged.

In any of the aspects or combinations of the aspects, the vehicle load may be determined based on torque demands of the first electric motor and the second electric motor.

In any of the aspects or combinations of the aspects, the motor coupling clutch may be engaged when a vehicle load decreases below a threshold value.

In any of the aspects or combinations of the aspects, the method may further comprise disengaging the motor coupling clutch when the steering angle exceeds a threshold value and/or when the vehicle load surpasses the threshold value.

In any of the aspects or combinations of the aspects, the controller may further include instructions that when executed, when the steering angle is greater than the threshold angle, cause the controller to rotationally decouple the first electric motor from the second electric motor via operation of the motor coupling clutch; operate the first electric motor to deliver mechanical power to the first drive wheel; and operate the second electric motor to deliver mechanical power to the second drive wheel.

In any of the aspects or combinations of the aspects, the motor coupling clutch may be a hydraulically operated friction clutch.

In any of the aspects or combinations of the aspects, the EV system may be included in an off-highway vehicle.

In any of the aspects or combinations of the aspects, the vehicle load may be determined based on an electric power consumption of the first electric motor and the second electric motor.

In one aspect, an electric vehicle (EV) system is provided that comprises a first electric drive axle, comprising a first pair of electric motors configured to transfer mechanical power to a first drive wheel and a second drive wheel, respectively; and a first motor coupling clutch configured to selectively rotationally couple the first pair of electric motors to one another; and a second electric drive axle, comprising a second pair of electric motors configured to transfer mechanical power to a third drive wheel and a fourth drive wheel, respectively; and a second motor coupling clutch configured to selectively rotationally couple the second pair of electric motors to one another; and a controller configured to selectively engage the first and/or second motor coupling clutches based on vehicle load.

In another aspect, a method for operation of an EV system is provided that comprises selectively engaging a first motor coupling clutch and a second motor coupling clutch in a first electric drive axle and a second electric drive axle based on vehicle load and steering angle; wherein the first electric drive axle includes electric motors on opposing sides of the axle which are rotationally coupled to the first motor coupling clutch; and wherein the second electric drive axle includes electric motors on opposing sides of the axle which are rotationally coupled to the second motor coupling clutch.

In yet another aspect, an electric vehicle (EV) system is provided that comprises a first electric drive axle, comprising a first pair of electric motors configured to transfer mechanical power to a first drive wheel and a second drive wheel, respectively; a first motor coupling clutch configured to selectively rotationally couple the first pair of electric motors to one another; and a second electric drive axle, comprising a second pair of electric motors configured to transfer mechanical power to a third drive wheel and a fourth drive wheel, respectively; a second motor coupling clutch configured to selectively rotationally couple the second pair of electric motors to one another; and a controller including instructions stored in memory that when executed when a steering angle is below a threshold value, cause the controller to engage the first motor coupling clutch when a load on the first electric drive axle is below a threshold value.

In any of the aspects or combinations of the aspects, selectively engaging the first and/or second motor coupling clutches may include engaging one of the motor coupling clutches while disengaging the other motor coupling clutch.

In any of the aspects or combinations of the aspects, selectively engaging the first and/or second motor coupling clutches may include engaging the first motor coupling clutch when a load on the first electric drive axle decreases below a threshold value and a steering angle is below a threshold value.

In any of the aspects or combinations of the aspects, selectively engaging the first and/or second motor coupling clutches may include disengaging the first motor coupling clutch when the load on the first electric drive axle increases above the threshold and/or the steering angle surpasses the threshold value.

In any of the aspects or combinations of the aspects, the controller may be further configured to shutdown one of the electric motors in the first pair of electric motors while the other electric motor is in operation.

In any of the aspects or combinations of the aspects, selectively engaging the first and/or second motor coupling clutches may include engaging the second motor coupling clutch when a load on the second electric drive axle decreases below a threshold value and a steering angle is below a threshold value.

In any of the aspects or combinations of the aspects, selectively engaging the first and/or second motor coupling clutches may include disengaging the second motor coupling clutch when the load on the second electric drive axle increases above the threshold and/or the steering angle surpasses the threshold value.

In any of the aspects or combinations of the aspects, the controller may be further configured to shutdown one of the electric motors in the second pair of electric motors while the other electric motor is in operation.

In any of the aspects or combinations of the aspects, the EV system may further comprise wheel end assemblies positioned between each of the electric motors and the drive wheels in each of the first and second electric drive axles.

In any of the aspects or combinations of the aspects, the first and second motor coupling clutches may be friction clutches.

In any of the aspects or combinations of the aspects, the EV system may further include an articulating frame.

In any of the aspects or combinations of the aspects, the EV system may be included in a heavy duty off-highway vehicle.

In any of the aspects or combinations of the aspects, the first pair of electric motors may be positioned coaxial to the first motor coupling clutch; and the second pair of electric motors may be positioned coaxial to the second motor coupling clutch.

In any of the aspects or combinations of the aspects, selectively engaging the first motor coupling clutch and the second motor coupling clutch may include engaging the first motor coupling clutch in response to a load on the first electric drive axle decreasing below a threshold value and disengaging the second motor coupling clutch in response to a load on the second electric drive axle increasing above a threshold value; and the method may further comprise shutting down one of the electric motors in the first electric drive axle while sustaining operation of the other electric motor in the first electric drive axle.

In any of the aspects or combinations of the aspects, the controller may further include instructions stored in the memory that when executed when the steering angle is below the threshold value, cause the controller to engage the second motor coupling clutch when a load on the second electric drive axle is below a threshold value.

In any of the aspects or combinations of the aspects, the controller may further include instructions stored in the memory that when executed when the steering angle is below the threshold value, cause the controller to shutdown one of the electric motors in the second pair of electric motors while the other electric motor in the second pair of electric motors is in operation when the load on the second electric drive axle is below the threshold value.

In any of the aspects or combinations of the aspects, the controller may further include instructions stored in the memory that when executed when the steering angle is below the threshold value, cause the controller to shutdown one of the electric motors in the first pair of electric motors while the other electric motor in the first pair of electric motors is in operation when the load on the first electric drive axle is below the threshold value.

In any of the aspects or combinations of the aspects, the EV system may further include an articulating frame and the steering angle may be measured via a sensor coupled to a pivot in the articulating frame.

In any of the aspects or combinations of the aspects, the motor coupling clutch may be a dog clutch.

In another representation, an EV system is provided that comprises multiple axles which each include traction motors that are rotational coupled to wheels on opposing lateral sides of the axle and are coupled to an articulating frame, wherein each of the axles include a clutch configured to temporarily rotationally connect the traction motors based on vehicle load.

Note that the example control and estimation routines included herein can be used with various powertrain, electric drive unit, and/or vehicle system configurations. The control methods and routines disclosed herein may be stored as executable instructions in non-transitory memory and may be carried out by the control system including the controller in combination with the various sensors, actuators, and other driveline system and/or vehicle hardware in combination with the electronic controller. As such, the described actions, operations, and/or functions may graphically represent code to be programmed into non-transitory memory of the computer readable storage medium in the vehicle and/or driveline control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or drive units. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric vehicle (EV) system, comprising:
    a first electric drive axle, comprising:
        a first pair of electric motors configured to transfer mechanical power to a first drive wheel and a second drive wheel, respectively; and
        a first motor coupling clutch configured to selectively rotationally couple the first pair of electric motors to one another; and
    a second electric drive axle, comprising:
        a second pair of electric motors configured to transfer mechanical power to a third drive wheel and a fourth drive wheel, respectively; and
        a second motor coupling clutch configured to selectively rotationally couple the second pair of electric motors to one another; and
    a controller configured to:
        selectively engage the first and/or second motor coupling clutches based on vehicle load.

2. The EV system of claim 1, wherein selectively engaging the first and/or second motor coupling clutches includes engaging one of the motor coupling clutches while disengaging the other motor coupling clutch.

3. The EV system of claim 1, wherein selectively engaging the first and/or second motor coupling clutches includes engaging the first motor coupling clutch when a load on the first electric drive axle decreases below a threshold value and a steering angle is below a threshold value.

4. The EV system of claim 3, wherein selectively engaging the first and/or second motor coupling clutches includes disengaging the first motor coupling clutch when the load on the first electric drive axle increases above the threshold and/or the steering angle surpasses the threshold value.

5. The EV system of claim 3, wherein the controller is further configured to:
    shutdown one of the electric motors in the first pair of electric motors while the other electric motor is in operation.

6. The EV system of claim 1, wherein selectively engaging the first and/or second motor coupling clutches includes engaging the second motor coupling clutch when a load on the second electric drive axle decreases below a threshold value and a steering angle is below a threshold value.

7. The EV system of claim 6, wherein selectively engaging the first and/or second motor coupling clutches includes disengaging the second motor coupling clutch when the load on the second electric drive axle increases above the threshold and/or the steering angle surpasses the threshold value.

8. The EV system of claim 6, wherein the controller is further configured to:
    shutdown one of the electric motors in the second pair of electric motors while the other electric motor is in operation.

9. The EV system of claim 1, further comprising wheel end assemblies positioned between each of the electric motors and the drive wheels in each of the first and second electric drive axles.

10. The EV system of claim 1, wherein the first and second motor coupling clutches are friction clutches.

11. The EV system of claim 1, wherein the EV system includes an articulating frame.

12. The EV system of claim 1, wherein the EV system is included in a heavy duty off-highway vehicle.

13. The EV system of claim 1, wherein:
the first pair of electric motors is positioned coaxial to the first motor coupling clutch; and
the second pair of electric motors is positioned coaxial to the second motor coupling clutch.

14. A method for operation of an EV system, comprising:
selectively engaging a first motor coupling clutch and a second motor coupling clutch in a first electric drive axle and a second electric drive axle based on vehicle load and steering angle;
wherein the first electric drive axle includes electric motors on opposing sides of the axle which are rotationally coupled to the first motor coupling clutch; and
wherein the second electric drive axle includes electric motors on opposing sides of the axle which are rotationally coupled to the second motor coupling clutch.

15. The method of claim 14, wherein:
selectively engaging the first motor coupling clutch and the second motor coupling clutch includes engaging the first motor coupling clutch in response to a load on the first electric drive axle decreasing below a threshold value and steering angle is below a threshold value; and disengaging the second motor coupling clutch in response to a load on the second electric drive axle increasing above a threshold value; and
the method further comprises shutting down one of the electric motors in the first electric drive axle while sustaining operation of the other electric motor in the first electric drive axle.

16. An electric vehicle (EV) system, comprising:
a first electric drive axle, comprising:
a first pair of electric motors configured to transfer mechanical power to a first drive wheel and a second drive wheel, respectively;
a first motor coupling clutch configured to selectively rotationally couple the first pair of electric motors to one another; and
a second electric drive axle, comprising:
a second pair of electric motors configured to transfer mechanical power to a third drive wheel and a fourth drive wheel, respectively;
a second motor coupling clutch configured to selectively rotationally couple the second pair of electric motors to one another; and
a controller including instructions stored in memory that when executed when a steering angle is below a threshold value, cause the controller to:
engage the first motor coupling clutch when a load on the first electric drive axle is below a threshold value.

17. The EV system of claim 16, wherein the controller further includes instructions stored in the memory that when executed when the steering angle is below the threshold value, cause the controller to:
engage the second motor coupling clutch when a load on the second electric drive axle is below a threshold value.

18. The EV system of claim 17, wherein the controller further includes instructions stored in the memory that when executed when the steering angle is below the threshold value, cause the controller to:
shutdown one of the electric motors in the second pair of electric motors while the other electric motor in the second pair of electric motor is in operation when the load on the second electric drive axle is below the threshold value.

19. The EV system of claim 16, wherein the controller further includes instructions stored in the memory that when executed when the steering angle is below the threshold value, cause the controller to:
shutdown one of the electric motors in the first pair of electric motors while the other electric motor in the first pair of electric motor is in operation when the load on the first electric drive axle is below the threshold value.

20. The EV system of claim 16, wherein the EV system includes an articulating frame and the steering angle is measured via a sensor coupled to a pivot in the articulating frame.

* * * * *